United States Patent
Ko et al.

(10) Patent No.: US 11,985,613 B2
(45) Date of Patent: May 14, 2024

(54) TRANSMITTING AND RECEIVING SYNCHRONIZATION SIGNAL IN WIRELESS COMMUNICATION BETWEEN TERMINALS AND APPARATUS THEREFOR

(71) Applicant: LG Electronics Inc., Seoul (KR)

(72) Inventors: Hyunsoo Ko, Seoul (KR); Youngsub Kim, Seoul (KR); Hanbyul Seo, Seoul (KR); Sukhyon Yoon, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 17/282,947

(22) PCT Filed: Nov. 4, 2019

(86) PCT No.: PCT/KR2019/014792
§ 371 (c)(1),
(2) Date: Apr. 5, 2021

(87) PCT Pub. No.: WO2020/091547
PCT Pub. Date: May 7, 2020

(65) Prior Publication Data
US 2021/0392592 A1    Dec. 16, 2021

(30) Foreign Application Priority Data
Nov. 2, 2018    (KR) .................. 10-2018-0133937

(51) Int. Cl.
*H04W 56/00*    (2009.01)
*H04L 5/00*    (2006.01)
(Continued)

(52) U.S. Cl.
CPC ......... *H04W 56/001* (2013.01); *H04L 5/0048* (2013.01); *H04L 27/2601* (2013.01);
(Continued)

(58) Field of Classification Search
CPC ............ H04L 27/2601; H04L 5/0048; H04W 56/001; H04W 56/0015; H04W 72/0446
See application file for complete search history.

(56) References Cited

U.S. PATENT DOCUMENTS

2017/0272299 A1*   9/2017   Chae .................. H04J 11/00
2018/0234931 A1*   8/2018   Ly .................. H04W 72/30

FOREIGN PATENT DOCUMENTS

| KR | 1020160107354 | 9/2016 |
| KR | 1020170048415 | 5/2017 |
| WO | WO2018144337 | 8/2018 |

OTHER PUBLICATIONS

MediaTek Inc., "TDM Based Unified SS Block Design for Both Above and Below 6 GHz," R1-1700159, 3GPP TSG RAN WG1 Ad Hoc Meeting, Spokane, Washington, USA, dated Jan. 16-20, 2017, 6 pages.

(Continued)

*Primary Examiner* — Zhensheng Zhang
(74) *Attorney, Agent, or Firm* — Fish & Richardson P.C.

(57) ABSTRACT

Disclosed is a method for transmitting, by a terminal supporting a sidelink, a sidelink synchronization signal block (S-SSB) in a wireless communication system. Specifically, the present disclosure comprises transmitting, from a specific slot, an S-SSB including a primary sidelink synchronization signal (PSSS), a secondary sidelink synchronization signal (SSSS), and a physical sidelink broadcast channel (PSBCH), wherein the PSBCH is mapped to first orthogonal frequency division multiplexing (OFDM) symbols included in the specific slot, and the first OFDM symbols are located after second OFDM symbols for the SSSS.

15 Claims, 31 Drawing Sheets

(51) Int. Cl.
  *H04L 27/26*    (2006.01)
  *H04W 72/0446*  (2023.01)
  *H04W 4/40*     (2018.01)
  *H04W 92/18*    (2009.01)

(52) U.S. Cl.
  CPC .......... *H04W 72/0446* (2013.01); *H04W 4/40* (2018.02); *H04W 92/18* (2013.01)

(56) References Cited

OTHER PUBLICATIONS

PCT International Search Report and Written Opinion in International Appln. No. PCT/KR2019/014792, dated Mar. 2, 2020, 15 pages (with English translation).

Samsung, "Discussion on physical layer structures and procedure(s) for NR V2X," R1-1810868, 3GPP TSG RAN WG1 #94bis, Chengdu, China, dated Oct. 8-12, 2018, 12 pages.

* cited by examiner (A) CONTROL-PLANE PROTOCOL STACK (B) USER-PLANE PROTOCOL STACK (a)

| OFDM symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Pattern 1 | A | B | P | P | B | – | – | – | – | B | S | S | B | – |
| Pattern 2 | A | P | P | B | B | – | – | – | – | B | B | S | S | – |
| Pattern 3 | A | P | P | S | S | – | – | – | – | B | B | B | B | – |
| Pattern 4 | A | P | P | B | B | – | – | – | – | S | S | B | B | – |

P : PSSS, S : SSSS, B : PSBCH A : AGC

FIG. 24

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Pattern 1 | A | B | P | P | B | S | S | B | B | – | – | – | – | – |
| Pattern 1-1 | A | B | P | P | B | S | B | S | B | | | | | |
| Pattern 2 | A | B | B | P | P | S | S | B | B | – | – | – | – | – |
| Pattern 2-1 | A | B | B | P | P | S | B | S | B | | | | | |
| Pattern 3 | A | B | B | P | P | B | B | S | S | – | – | – | – | – |
| Pattern 3-1 | A | B | B | P | P | B | S | B | S | | | | | |
| Pattern 4 | A | P | P | B | B | B | B | S | S | – | – | – | – | – |
| Pattern 4-1 | A | P | P | B | B | S | B | B | S | | | | | |
| Pattern 5 | A | P | P | B | B | S | S | B | B | – | – | – | – | – |
| Pattern 6 | A | P | P | S | S | B | B | B | B | – | – | – | – | – |
| Pattern 6-1 | A | P | P | S | B | B | S | B | B | | | | | |
| Pattern 7 | A | B | S | B | P | P | B | S | B | | | | | |

P : PSSS, S : SSSS, B : PSBCH A : AGC

FIG. 25

|  | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Pattern 1 | A | B | P | P | B | S | S | B | B | B | B | – | – | – |
| Pattern 2 | A | B | B | P | P | S | S | B | B | B | B | – | – | – |
| Pattern 3 | A | B | B | P | P | B | B | S | S | B | B | – | – | – |
| Pattern 4 | A | P | P | B | B | B | B | S | S | B | B | – | – | – |
| Pattern 5 | A | P | P | B | B | S | S | B | B | B | B | – | – | – |
| Pattern 6 | A | P | P | S | S | B | B | B | B | B | B | – | – | – |

P : PSSS, S : SSSS, B : PSBCH A : AGC

FIG. 26

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Pattern 1 | A | B | B | P | P | B | B | B | B | S | S | B | B | - |
| Pattern 2 | A | P | P | B | B | B | B | B | B | B | B | S | S | - |
| Pattern 3 | A | P | P | B | B | B | B | B | S | S | B | B | B | - |
| Pattern 4 | A | P | P | S | S | B | B | B | B | B | B | B | B | - |

P : PSSS, S : SSSS, B : PSBCH A : AGC (a)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Pattern 1 | A | B | P | P | B | S | S | B | B | B | B | B | B | - |
| Pattern 2 | A | B | B | P | P | S | S | B | B | B | B | B | B | - |
| Pattern 3 | A | B | B | P | P | B | B | S | S | B | B | B | B | - |
| Pattern 4 | A | P | P | B | B | B | B | S | S | B | B | B | B | - |
| Pattern 5 | A | P | P | B | B | S | S | B | B | B | B | B | B | - |
| Pattern 6 | A | P | P | S | S | B | B | B | B | B | B | B | B | - |

P : PSSS, S : SSSS, B : PSBCH A : AGC (b)

TRANSMITTING AND RECEIVING SYNCHRONIZATION SIGNAL IN WIRELESS COMMUNICATION BETWEEN TERMINALS AND APPARATUS THEREFOR

CROSS-REFERENCE TO RELATED APPLICATIONS

This application is a National Stage application under 35 U.S.C. § 371 of International Application No. PCT/KR2019/014792, filed on Nov. 4, 2019, which claims the benefit of Korean Application No. 10-2018-0133937, filed on Nov. 2, 2018. The disclosures of the prior applications are incorporated by reference in their entirety.

TECHNICAL FIELD

The present disclosure relates to a method of transmitting and receiving a synchronization signal in wireless communication between user equipments (UEs) and an apparatus therefor. More specifically, the present disclosure relates to a method of generating and mapping a synchronization signal used in vehicle-to-everything (V2X) communication and an apparatus therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle-to-everything (V2X), emergency service, and remote control), and mMTC is a future-generation mobile communication scenario characterized by low cost, low energy, short packet, and massive connectivity (e.g., Internet of things (IoT)).

SUMMARY

The present disclosure provides a method of transmitting and receiving a synchronization signal in wireless communication between UEs and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, provided herein is a method of transmitting a sidelink synchronization signal block (S-SSB) by a user equipment (UE) supporting sidelink in a wireless communication system, including transmitting the S-SSB including a primary sidelink synchronization signal (PSSS), a secondary sidelink synchronization signal (SSSS), and a physical sidelink broadcast channel (PSBCH) in a specific slot, wherein the PSBCH is mapped to first orthogonal frequency division multiplexing (OFDM) symbols included in the specific slot, and wherein the first OFDM symbols are located after second OFDM symbols for the SSSS.

The second OFDM symbols are located after third OFDM symbols for the PSSS included in a first half of the specific slot.

The second OFDM symbols and the third OFDM symbols may be continuous.

At least one fourth OFDM symbol for the PSBCH may be located between the second OFDM symbols and the third OFDM symbols and the number of the first OFDM symbols may be larger than the number of the at least one fourth OFDM symbol.

A demodulation reference signal (DMRS) for the PSBCH may be mapped to at least one first OFDM symbol among the first OFDM symbols, and the DMRS may be mapped to the at least one first OFDM symbol at an equal interval and may be initialized based on a specific identifier (ID).

At least one fifth OFDM symbol for the PSBCH may be located prior to the third OFDM symbols.

The PSSS, the SSSS, and the PSBCH are not mapped to a last OFDM symbol of the specific slot, and the first OFDM symbols may include OFDM symbols from an OFDM symbol located immediately after a last OFDM symbol of the second OFDM symbols to an OFDM symbol located immediately before a last OFDM symbol of the specific slot.

According to another aspect of the present disclosure, provided herein is an apparatus supporting sidelink for transmitting a sidelink synchronization signal block (S-SSB) in a wireless communication system, including at least one processor; and at least one memory operably connected to the at least one processor and configured to store instructions that cause the at least one processor to perform a specific operation based on execution of the instructions, wherein the specific operation includes transmitting the S-SSB including a primary sidelink synchronization signal (PSSS), a secondary sidelink synchronization signal (SSSS), and a physical sidelink broadcast channel (PSBCH) in a specific slot, wherein the PSBCH is mapped to first orthogonal frequency division multiplexing (OFDM) symbols included in the specific slot, and wherein the first OFDM symbols are located after second OFDM symbols for the SSSS.

The second OFDM symbols may be located after third OFDM symbols for the PSSS included in a first half of the specific slot.

The second OFDM symbols and the third OFDM symbols may be continuous.

At least one fourth OFDM symbol for the PSBCH may be located between the second OFDM symbols and the third OFDM symbols and the number of the first OFDM symbols may be larger than the number of the at least one fourth OFDM symbol.

At least one fifth OFDM symbol for the PSBCH may be located prior to the third OFDM symbols.

The PSSS, the SSSS, and the PSBCH are not mapped to a last OFDM symbol of the specific slot, and the first OFDM symbols may include OFDM symbols from an OFDM symbol located immediately after a last OFDM symbol of the second OFDM symbols to an OFDM symbol located immediately before a last OFDM symbol of the specific slot.

A demodulation reference signal (DMRS) for the PSBCH may be mapped to at least one first OFDM symbol among the first OFDM symbols, and the DMRS may be mapped to the at least one first OFDM symbol at an equal interval and may be initialized based on a specific identifier (ID).

According to another aspect of the present disclosure, provided herein is a user equipment (UE) supporting sidelink for transmitting a sidelink synchronization signal block (S-SSB) in a wireless communication system, including at least one transceiver; at least one processor; and at least one memory operably connected to the at least one processor and configured to store instructions that cause the at least one processor to perform a specific operation based on execution of the instructions, wherein the specific operation includes transmitting the S-SSB including a primary sidelink synchronization signal (PSSS), a secondary sidelink synchronization signal (SSSS), and a physical sidelink broadcast channel (PSBCH) in a specific slot through the at least one transceiver, wherein the PSBCH is mapped to first orthogonal frequency division multiplexing (OFDM) symbols included in the specific slot, and wherein the first OFDM symbols are located after second OFDM symbols for the SSSS.

According to the present disclosure, a synchronization signal in V2X communication may be efficiently transmitted and received.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIGS. 23 to 26 are diagrams illustrating an implementation example of mapping a synchronization signal in V2X according to the present disclosure.

DETAILED DESCRIPTION

Figure 1:
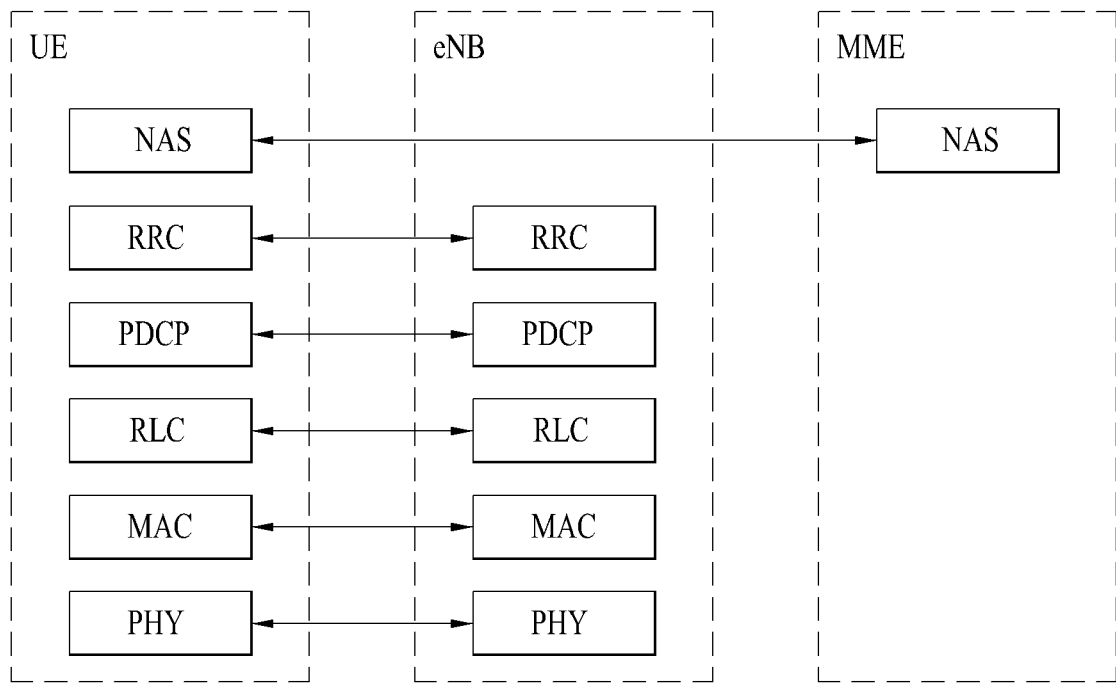
FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
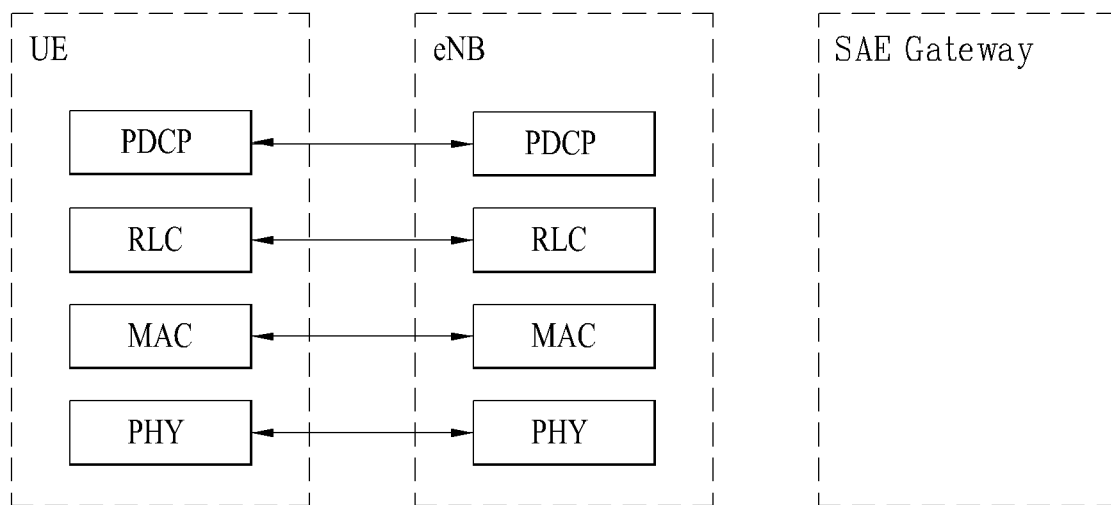

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCPUL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
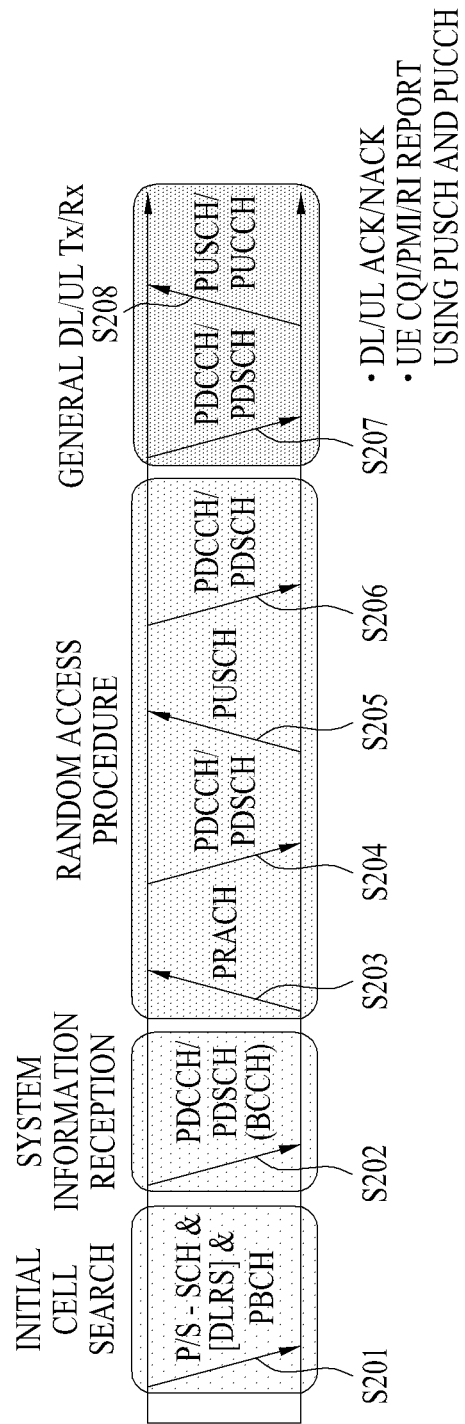
FIG. 2 is a diagram illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 3:
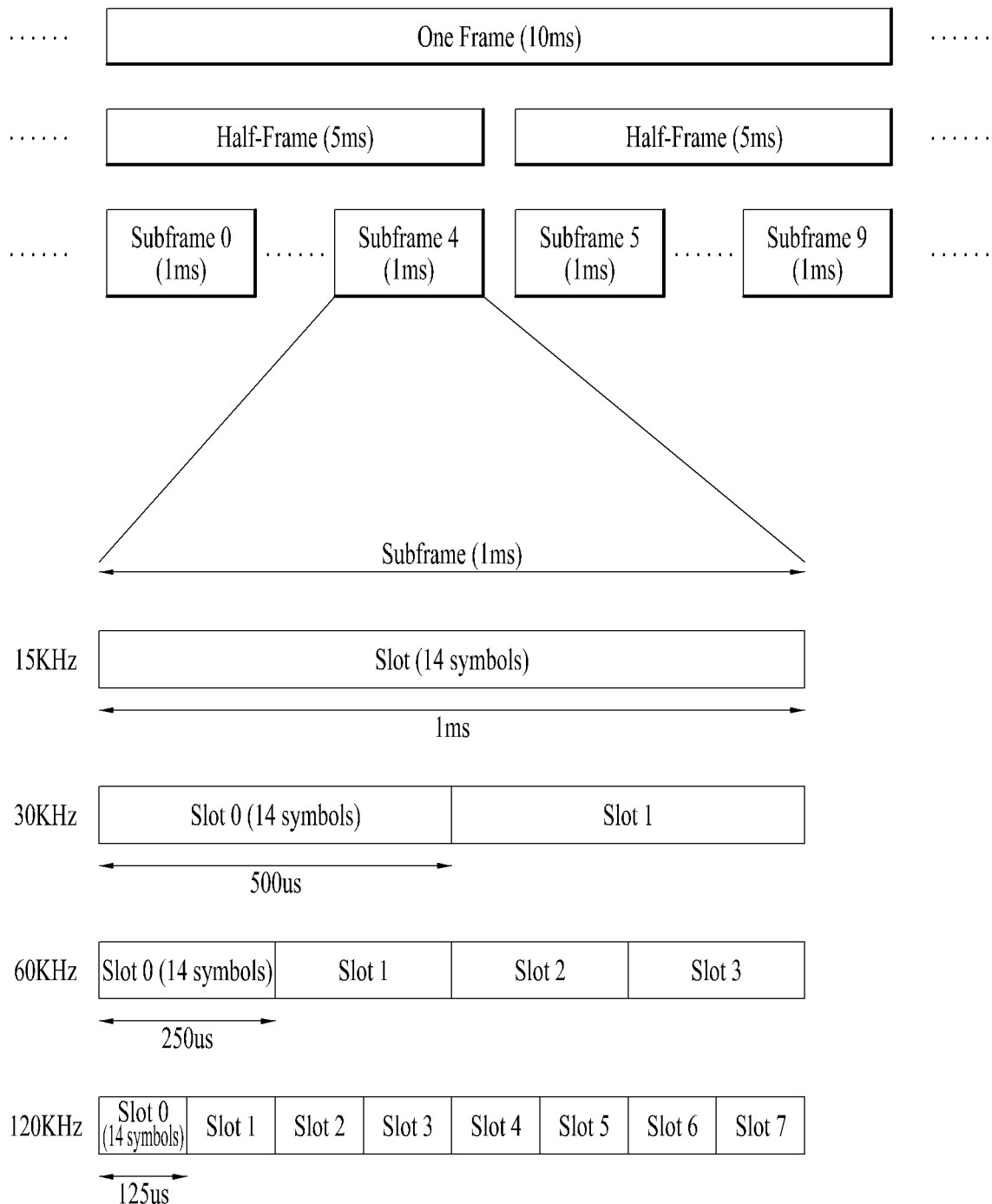
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe

[Table 2] illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

Figure 4:
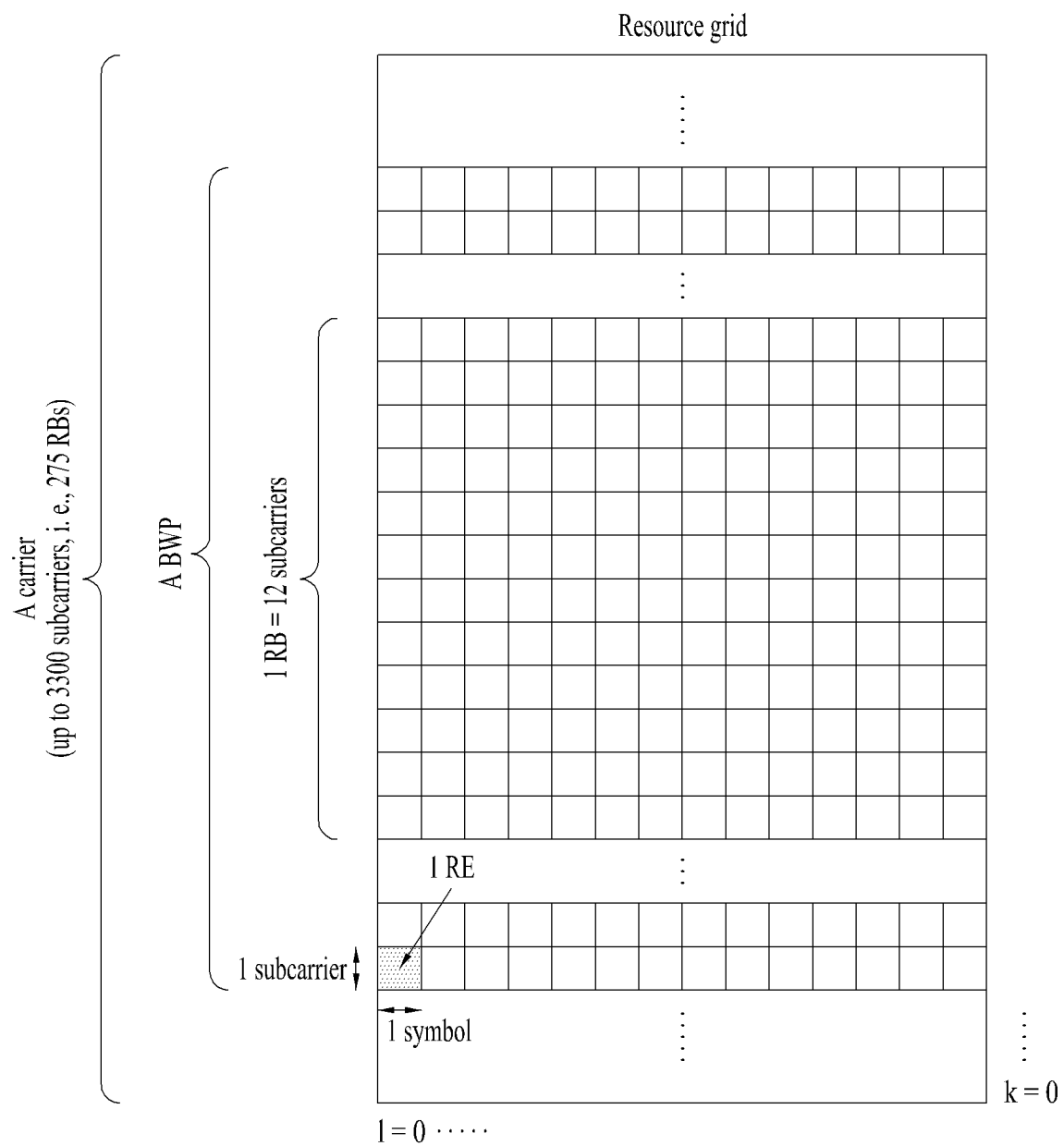
Figure 5:
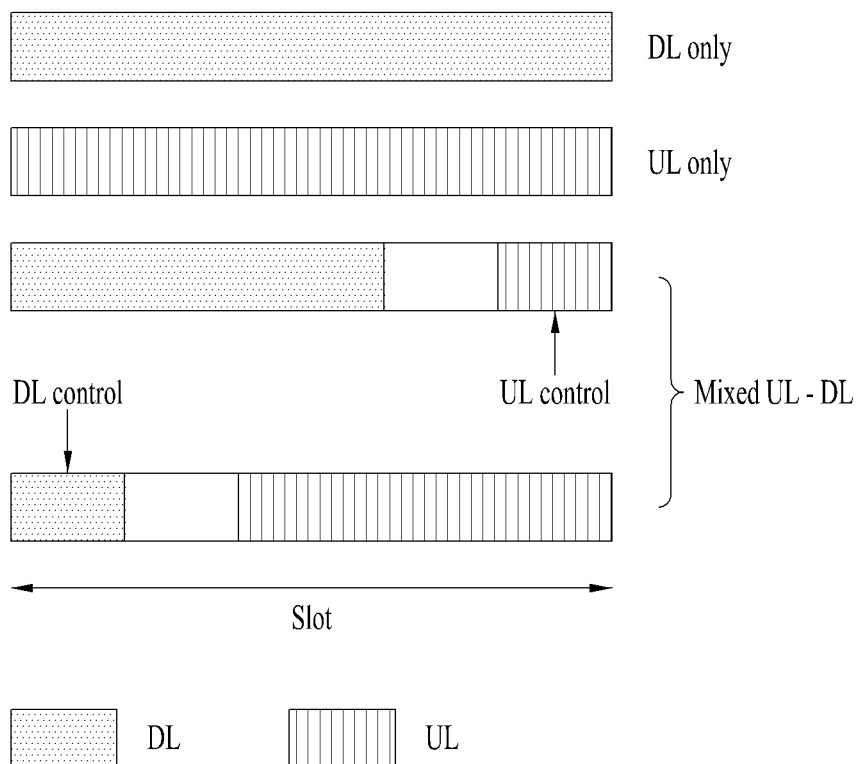

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 4 illustrates a slot structure of an NR frame. A slot includes a plurality of symbols in the time domain. For example, in the case of the normal CP, one slot includes 14 symbols. On the other hand, in the case of the extended CP, one slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto. FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.
1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

V2X (Vehicle-to-Everything)

V2X communication refers to communication between vehicles and all entities, covering vehicle-to-vehicle (V2V) which is communication between vehicles, vehicle-to-infrastructure (V2I) which is communication between a vehicle and an eNB or road side unit (RSU), vehicle-to-pedestrian (V2P) which is communication between a vehicle and a UE carried by an individual person (pedestrian, biker, vehicle driver, or passenger), and vehicle-to-network (V2N).

In its meaning, V2X communication may be identical to or encompass V2X sidelink (SL) or NR V2X.

V2X communication may find its uses in various services including, for example, forward collision warning, an automatic parking system, cooperative adaptive cruise control (CACC), loss of control warning, traffic queue warning, safety warning for vulnerable road users, emergency vehicle warning, speed warning during driving on curved roads, and traffic flow control.

V2X communication may be provided via a PC5 interface and/or a Uu interface. In a wireless communication system supporting V2X communication, specific network entities may exist to support communication between vehicles and all entities. For example, the network entities may include a BS (eNB), an RSU, a UE, and an application server (e.g., a traffic safety server).

A UE performing V2X communication may be a vehicle UE (V-UE), a pedestrian UE, a BS-type (eNB-type) RSU, a UE-type RSU, or a robot equipped with a communication module, as well as a general portable UE (handheld UE).

V2X communication may be conducted between UEs, directly or through network entity(s). Depending on these V2X communication schemes, V2X operation modes may be classified.

For V2X communication, the pseudonymity and privacy of UEs need to be supported to prevent an operator or a third party from tracking UE identifiers (IDs) in regions where V2X is supported.

Terms frequently used for V2X communication are defined as follows.

RSU (Road Side Unit): An RSU is a V2X-enabled device which may transmit/receive a signal to and/from a moving vehicle by V2Iservice. The RSU may be a fixed infrastructure entity supporting V2X applications, which may exchange messages with other entities supporting the V2X applications. RSU is a term frequently used in the existing ITS specifications and introduced to the 3GPP specifications to help with easy reading of documents in the ITS industry. The RSU is a logical entity that combines a V2X application logic with the function of a BS (referred to as a BS-type RSU) or a UE (referred to as a UE-type RSU).

V2Iservice: A type of V2X service, in which one party is a vehicle and the other party is infrastructure.

V2P service: A type of V2X service, in which one party is a vehicle and the other party is a portable device carried by an individual person (e.g., a portable UE carried by a pedestrian, biker, driver, or passenger).

V2X service: A 3GPP communication service type in which a transmission or reception device is related to a vehicle.

V2X-enabled UE: A UE that supports V2X service.

V2V service: A type of V2X service in which both communication parties are vehicles.

V2V communication range: A direct communication range between two vehicles participating in V2V service.

As described above, there are four types of V2X applications which are also called V2X: (1) V2V, (2) V21, (3) V2N, and (4) V2P.

Figure 6:
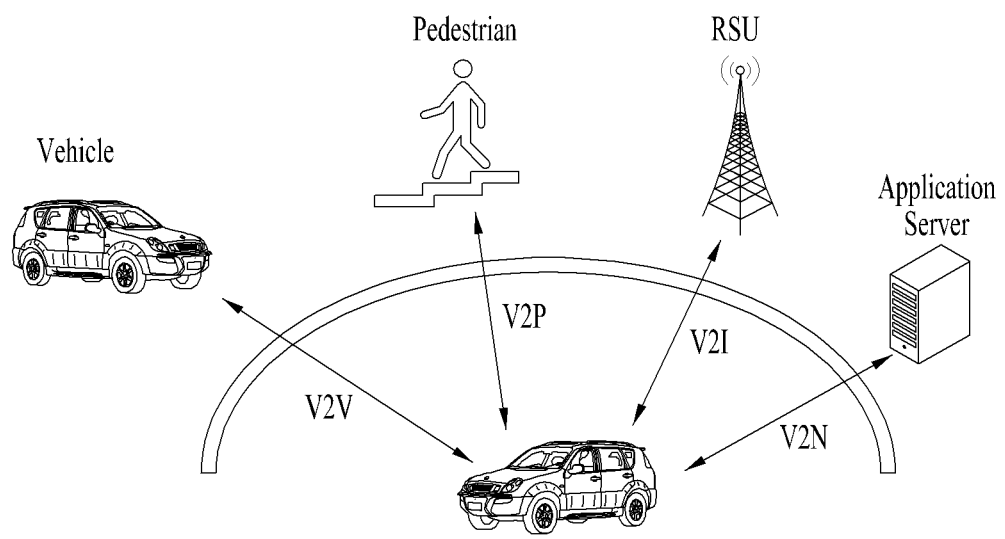
FIG. 6 is a diagram illustrating various types of vehicle-to-everything (V2X) applications.

FIG. 6 is a diagram illustrating the types of V2X applications.

These four types of V2X applications may use "cooperative awareness" to provide more intelligent services to end users. This implies that entities such as a vehicle, roadside infrastructure, an application server, and a pedestrian are allowed to collect, process, and share knowledge of a corresponding regional environment (e.g., information received from other adjacent vehicles or sensor devices) to provide more intelligent information such as cooperative collision warnings or autonomous driving information.

These intelligent transport services and related message sets have been defined by automotive standards developing organizations (SDOs) outside the 3GPP.

Three basic classes for providing ITS services: road safety, traffic efficiency, and other applications are described, for example, in ETSI TR 102 638 V1.1.1: "Vehicular Communications; Basic Set of Applications; Definitions".

The radio protocol architectures of the user plane and control plane for V2X communication may be basically identical to the protocol stack structure for SL (see FIG. L2). The radio protocol structure of the user plane may include PDCP, RLC, MAC, and PHY, and the radio protocol structure of the control plane may include RRC, RLC, MAC, and PHY. For details of the protocol stacks for V2X communication, refer to 3GPP TS 23.303, 3GPP TS 23.285, 3GPP TS 24.386, and so on.

Figure 7:
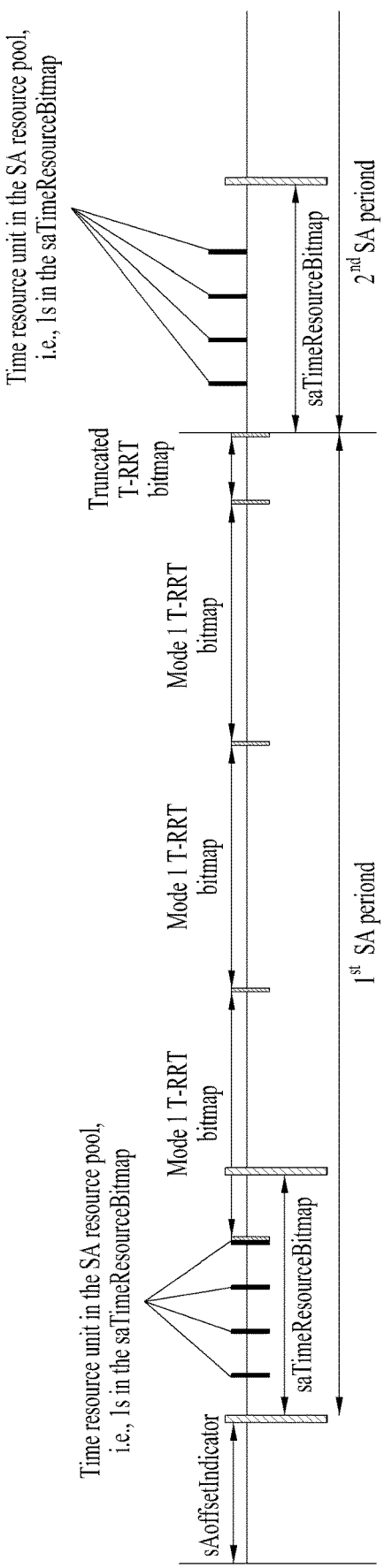
FIGS. 7, 8, 9 and 10 are diagrams illustrating resource allocation and resource selection in V2X.

FIG. 7 is a diagram illustrating an example of transmitting a physical sidelink control channel (PSCCH) in SL transmission mode 1 or 2 to which the present disclosure is applicable.

A UE of SL transmission mode 1 may transmit a PSCCH (or an SL control signal or SL control information (SCI)) on a resource configured by a BS. A UE of SL transmission mode 2 is configured by the BS with a resource to be used for SL transmission and may transmit the PSCCH by selecting a time-frequency resource from the configured resource.

In SL transmission mode 1 or 2, a PSCCH period may be defined as illustrated in FIG. 7. Referring to FIG. 7, the first PSCCH period may be started in a time resource unit separated by a predetermined offset indicated by higher layer signaling from a specific system frame. Each PSCCH period may include a PSCCH resource pool, and a time resource unit pool for SL data transmission. The PSCCH resource pool may include the first time resource unit of the PSCCH period to the last time resource unit among time resource units indicated as carrying the PSCCH by a time resource unit bitmap. The resource pool for SL data transmission may determine a time resource unit used for actual data transmission by applying a time-resource pattern for transmission (T-RPT) (or a time-resource pattern (TRP)) in mode 1. As illustrated, when the number of time resource units included in the PSCCH period except for the PSCCH resource pool is larger than the number of T-RPT bits, the T-RPT may be repeatedly applied, and the last T-RPT may be applied by truncating as many time resource units as the number of remaining time resource units. A transmitting UE may perform transmission at T-RPT positions corresponding to is in a T-RPT bitmap, and one MAC packet data unit (PDU) may be transmitted four times.

Figure 8:
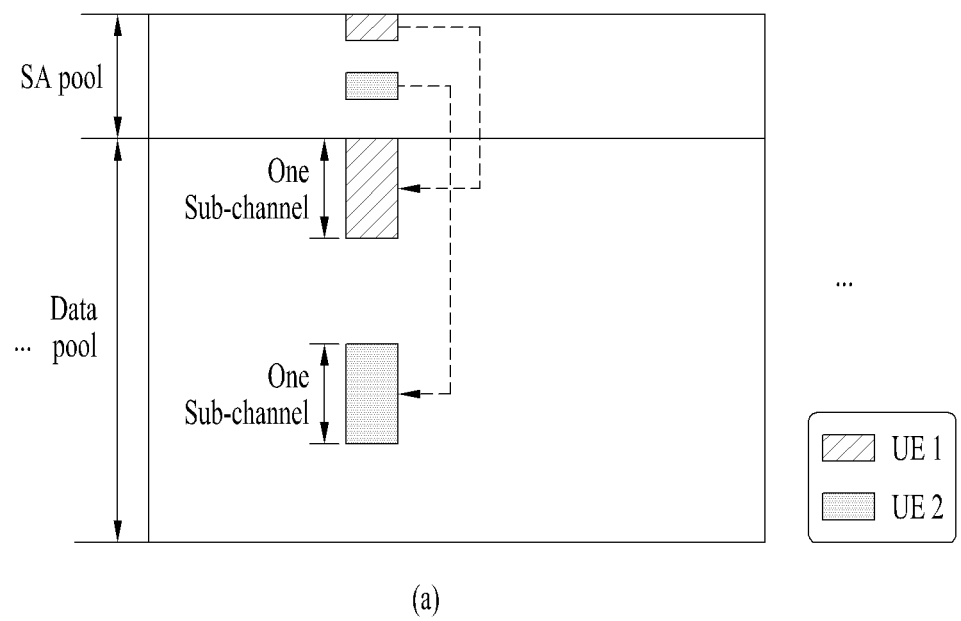
Figure 8:
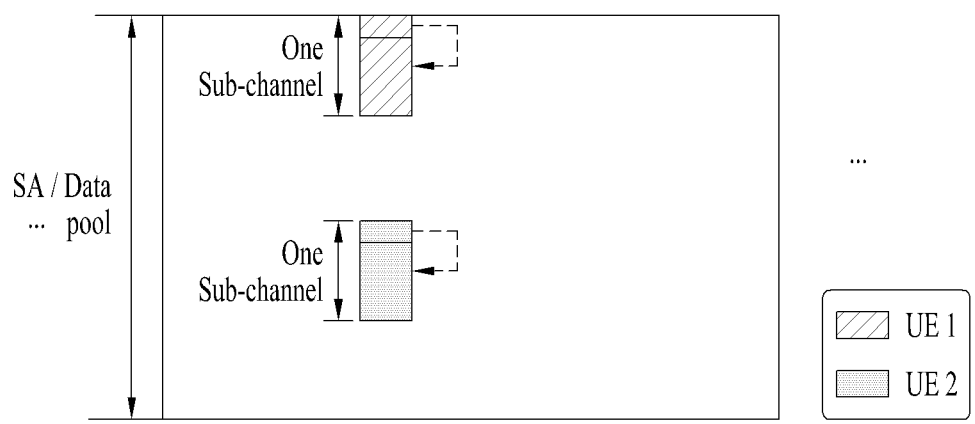

FIG. 8 is a diagram illustrating an example of transmitting a physical sidelink control channel (PSCCH) in SL transmission mode 3 or 4 to which the present disclosure may be applied.

Compared to SL communication, a PSCCH and a PSSCH are transmitted in FDM in V2X communication, that is, in SL transmission mode 3 or 4. Because latency reduction is an important factor in view of the nature of vehicle transmission in V2X communication, the PSCCH and the PSSCH may be transmitted in frequency division multiplexing (FDM) in different frequency resources of the same time resources. Referring to FIG. 8, the PSCCH and the PSSCH may be spaced from each other as illustrated in FIG. 8(*a*) or may be contiguous to each other as illustrated FIG. 8(*b*). The basic unit of this transmission is a sub-channel. A sub-channel may be a resource unit with a size of one or more RBs on the frequency axis in predetermined time resources (e.g., a time resource unit). The number of RBs included in the sub-channel (i.e., the size and frequency-axis starting position of the sub-channel) may be indicated by higher-layer signaling. The embodiment of FIG. 8 may also be applied to NR SL resource allocation mode 1 or 2.

There are transmission modes 1, 2, 3 and 4 for SL.

In transmission mode ⅓, the BS performs resource scheduling for UE 1 by a PDCCH (more specifically, DCI), and UE 1 performs device-to-device (D2D)/V2X communication with UE 2 according to the resource scheduling. After transmitting sidelink control information (SCI) to UE 2 on a PSCCH, UE 1 may transmit data to UE 2 on a physical sidelink shared channel (PSSCH) based on the SCI. Transmission mode 1 may be applied to D2D communication, and transmission mode 3 may be applied to V2X communication.

Transmission mode ⅔ may be a mode in which the UE autonomously performs scheduling. More specifically, transmission mode 2 is applied to D2D communication. In transmission mode 2, the UE may perform a D2D operation by autonomously selecting resources from a configured resource pool. Transmission mode 4 is applied to V2X communication. In transmission mode 4, after autonomously selecting resources within a selection window through a sensing process, the UE may perform a V2X operation in the selected resources. UE 1 may transmit SCI to UE 2 on a PSCCH and then transmit data to UE 2 on a PSSCH based on the SCI. Hereinafter, a transmission mode may be referred to shortly as a mode.

Control information transmitted from a BS to a UE on a PDCCH may be referred to as downlink control information (DCI), whereas control information transmitted from a UE to another UE on a PSCCH may be referred to as SCI. SCI may include SL scheduling information. Various formats may be available for the SCI, for example, SCI format 0 and SCI format 1.

SCI format 0 may be used for PSSCH scheduling. SCI format 0 may include a frequency hopping flag (1 bit), a resource block allocation and hopping resource allocation field (having a variable number of bits depending on the number of sidelink RBs), a time resource pattern, a modulation and coding scheme (MCS), a time advance indication, a group destination ID, and so on.

SCI format 1 may be used for PSSCH scheduling. SCI format 1 includes priority, resource reservation, frequency resource positions of an initial transmission and a retransmission (having a variable number of bits depending on the number of SL subchannels), a time gap between the initial transmission and the retransmission, an MCS, a retransmission index, and so on.

SCI format 0 may be used in transmission modes 1 and 2, and SCI format 1 may be used in transmission modes 3 and 4.

Now, a detailed description will be given of resource allocation in mode 3 and mode 4 which are applied to V2X. First, mode 3 will be described.

1. Mode 3

Mode 3 may be a scheduled resource allocation mode. The UE may be in an RRC_CONNECTED state to transmit data.

Figure 9:
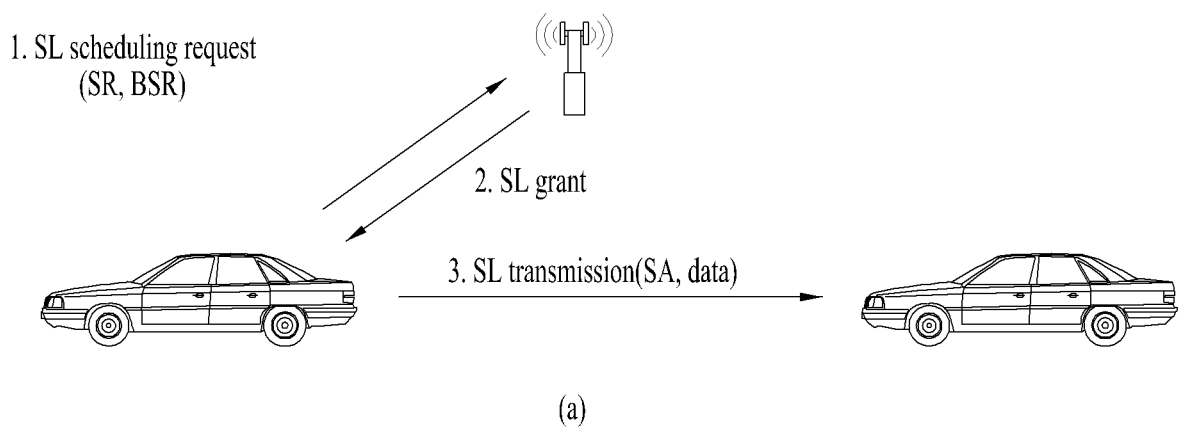
Figure 9:
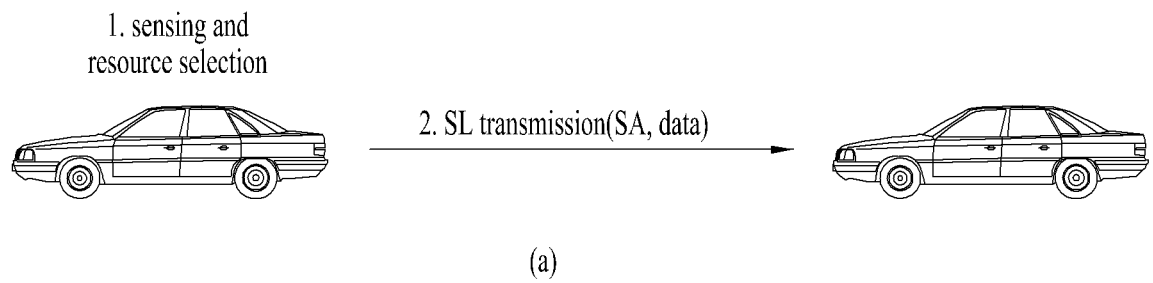

FIG. 9(*a*) illustrates a mode-3 operation of a UE.

The UE may request transmission/reception resources to the BS, and the BS may schedule resource(s) related to transmission/reception of SCI and/or data for the UE. SL semi-persistent scheduling (SPS) may be supported for the scheduled resource allocation. The UE may transmit/receive SCI and/or data to/from another UE in the allocated resources.

2. Mode 4

FIG. 9(*b*) illustrates a mode-4 operation of a UE.

Mode 4 may be a UE-autonomous resource selection mode. The UE may perform sensing for (re)selection of SL resources. Based on the result of the sensing, the UE may randomly select/reserve SL resource from among the remaining resources except for specific resources. The UE may perform up to two parallel independent resource reservation processes.

Sensing and resource selection in mode 4 will be described in greater detail.

Figure 10:
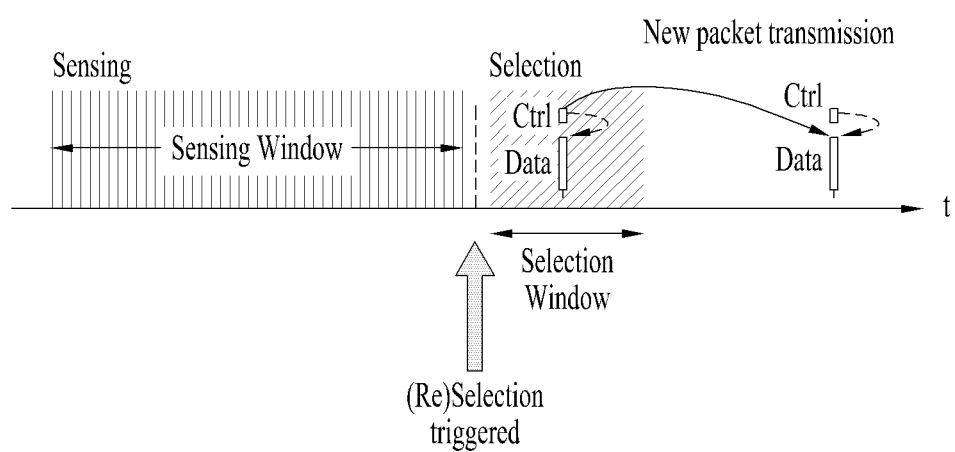

FIG. 10 illustrates sensing and resource selection in mode 4.

As described above, the UE may perform sensing to select mode-4 transmission resources. In V2X communication, two transmissions per MAC protocol data unit (MAC PDU) may be performed. For example, referring to FIG. 10, when resources are selected for an initial transmission, resources for a retransmission may be reserved after a predetermined time gap.

For example, the UE may identify transmission resources reserved or in use by other UEs through sensing within a sensing window and select any resources with less interference from among the remaining resources in the sensing window except for the identified transmission resources.

For example, the UE may decode a PSCCH including information about the periodicity of reserved resources within the sensing window, and measure PSSCH reference signal received power (RSRP) in periodically determined resources based on the PSCCH. Resources with PSSCH RSRP values exceeding a threshold may be excluded from the selection window. Then, SL resources may be randomly selected from among the remaining resources in the selection window.

Alternatively, received signal strength indications (RSSIs) are measured in periodic resources within the sensing window, and resources with less interference corresponding to the lower 20% of the RSSIs are identified. SL resources may be randomly selected from among resources included in the selection window among the periodic resources. For example, when PSCCH decoding is failed, this method may be used.

A bandwidth part (BWP) and a resource pool will be described below.

When bandwidth adaptation (BA) is used, the reception bandwidth and transmission bandwidth of the UE need not be as large as the bandwidth of a cell, and may be adjusted. For example, the network/BS may indicate bandwidth adjustment to the UE. For example, the UE may receive information/a configuration for bandwidth adjustment from the network/BS. In this case, the UE may perform bandwidth adjustment based on the received information/configuration. For example, the bandwidth adjustment may include decrease/increase of a bandwidth, change of the position of the bandwidth, or change of the subcarrier spacing (SCS) of the bandwidth.

For example, the bandwidth may be reduced during a low-activity period to save power. For example, the position of the bandwidth may move in the frequency domain. For example, the position of the bandwidth may be moved in the frequency domain to increase scheduling flexibility. For example, the SCS of the bandwidth may be changed. For example, the SCS of the bandwidth may be changed to allow different services. A subset of the total cell bandwidth of a cell may be referred to as a BWP. BA may be performed by configuring BWPs and indicating a current active BWP to the UE among the configured BWPs by the BS/network.

Figure 11:
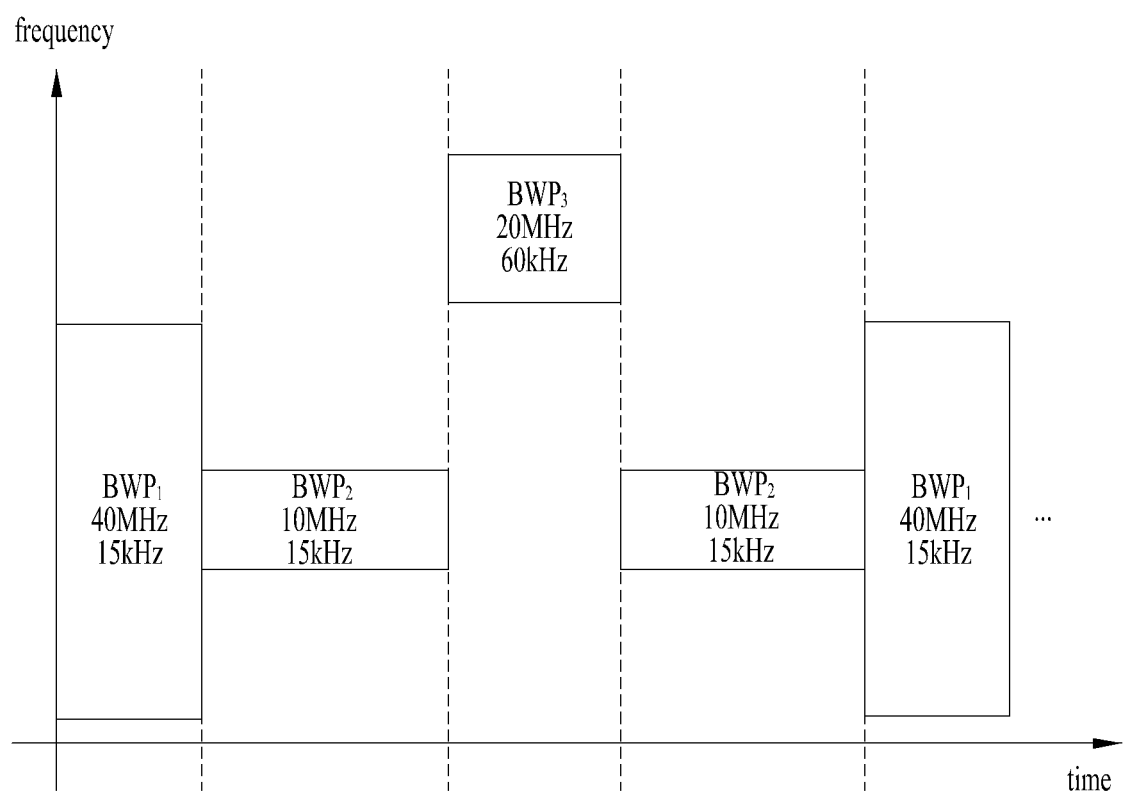
FIG. 11 is a diagram illustrating bandwidth parts (BWPs) and resource pools in V2X.

FIG. 11 illustrates an exemplary scenario in which BWPs are configured, to which the present disclosure may be applied.

Referring to FIG. 11, BWP1 with a bandwidth of 40 MHz and an SCS of 15 kHz, BWP2 with a bandwidth of 10 MHz and an SCS of 15 kHz, and BWP3 with a bandwidth of 20 MHz and an SCS of 60 kHz may be configured.

A BWP may be defined for SL. The same SL BWP may be used for transmission and reception. For example, a transmitting UE may transmit an SL channel or SL signal in a specific BWP, and a receiving UE may receive the SL channel or SL signal in the specific BWP. In a licensed carrier, an SL BWP may be defined separately from a Uu BWP, and the SL BWP may have separate configuration signaling from that of the Uu BWP. For example, the UE may receive a configuration for the SL BWP from the BS/network. The SL BWP may be (pre)configured in a carrier, for an out-of-coverage NR V2X UE and an RRC_IDLE UE. For an RRC_CONNECTED UE, at least one SL BWP may be activated in the carrier.

A resource pool may be a set of time-frequency resources available for SL transmission and/or SL reception. From the viewpoint of the UE, the time-domain resources of the resource pool may not be contiguous. A plurality of resource pools may be (pre)configured in one carrier, for the UE.

Figure 12:
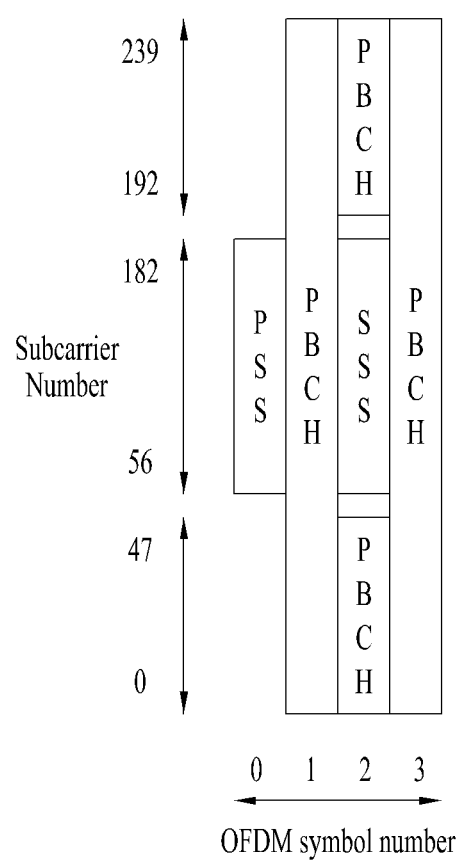
FIGS. 12, 13, 14, 15 and 16 are diagrams illustrating the composition of a synchronization signal/physical broadcast channel (SS/PBCH) block and a method of transmitting an SS/PBCH block.

FIG. 12 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 12, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

Cell Search

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 3 below.

TABLE 3

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/Search space configuration |
| 5th Step | PDCCH and PDSCH | Cell access information RACH configuration |

There may be 336 cell ID groups each having three cell IDs. A total of 1008 cell IDs may be present, and a cell ID may be defined by Equation 1.

$$N_{ID}^{cell} = 3N_{ID}^{(1)} + N_{ID}^{(2)} \text{ where } N_{ID}^{(1)} \in \{0,1,\ldots,335\} \text{ and } N_{ID}^{(2)} \in \{0,1,2\}. \quad \text{[Equation 1]}$$

where $N^{cell}_{ID}$ denotes a cell ID (e.g., PCID). $N^{(1)}_{ID}$ denotes a cell ID group and is provided/acquired through an SSS. $N^{(2)}_{ID}$ denotes a cell ID in a cell ID group and is provided/acquired through a PSS.

A PSS sequence $d_{PSS}(n)$ may be defined to satisfy Equation D2.

$$d_{PSS}(n) = 1 - 2x(m) \quad \text{[Equation 2]}$$

$m = (n + 43N_{ID}^{(2)}) \bmod 127$
$0 \le n < 127$, where
$x(i+7) = (x(i+4) + x(i)) \bmod 2$, and
$[x(6)\ x(5)\ x(4)\ x(3)\ x(2)\ x(1)\ x(0)] = [1\ 1\ 1\ 0\ 1\ 1\ 0]$.

An SSS sequence $d_{SSS}(n)$ may be defined to satisfy Equation 3.

$$d_{SSS}(n) = [1 - 2x_0((n + m_0) \bmod 127)][1 - 2x_1((n + m_1) \bmod 127)] \quad \text{[Equation 3]}$$

$$m_0 = 15 \left\lfloor \frac{N_{ID}^{(1)}}{112} \right\rfloor + 5N_{ID}^{(2)}$$

$$m_1 = N_{ID}^{(1)} \bmod 112$$

$0 \le n < 127,$ where
$x_0(i+7) = (x_0(i+4) + x_0(i)) \bmod 2$
$x_1(i+7) = (x_1(i+1) + x_1(i)) \bmod 2$, and
$[x_0(6)\ x_0(5)\ x_0(4)\ x_0(3)\ x_0(2)\ x_0(1)\ x_0(0)] = [0\ 0\ 0\ 0\ 0\ 0\ 1]$
$[x_1(6)\ x_1(5)\ x_1(4)\ x_1(3)\ x_1(2)\ x_1(1)\ x_1(0)] = [0\ 0\ 0\ 0\ 0\ 0\ 1]$.

Figure 13:
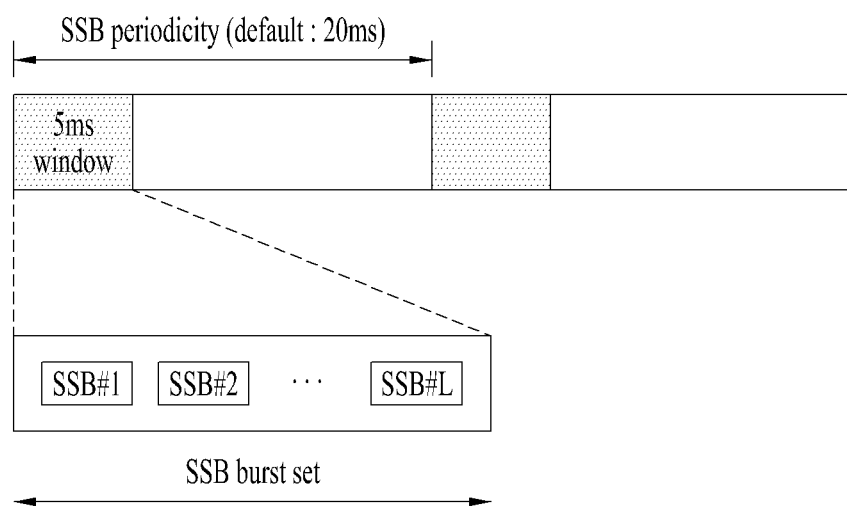

FIG. 13 illustrates SSB transmission. Referring to FIG. 13, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L-1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Figure 14:
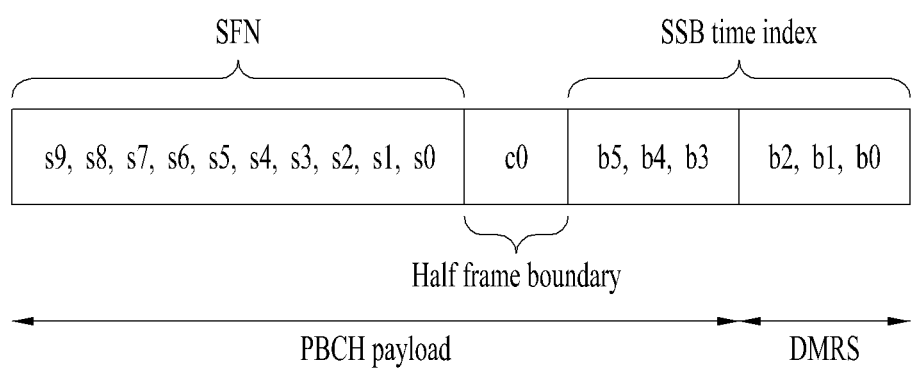

FIG. 14 illustrates exemplary acquisition of information about DL time synchronization at a UE. Referring to FIG. 14, the UE may acquire DL synchronization by detecting an SSB. The UE may identify the structure of an SSB burst set based on the index of the detected SSB, and thus detect a symbol/slot/half-frame boundary. The number of a frame/half-frame to which the detected SSB belongs may be identified by SFN information and half-frame indication information.

Specifically, the UE may acquire 10-bit SFN information, s0 to s9 from a PBCH. 6 bits of the 10-bit SFN information is acquired from a master information block (MIB), and the remaining 4 bits is acquired from a PBCH transport block (TB).

Subsequently, the UE may acquire 1-bit half-frame indication information c0. If a carrier frequency is 3 GHz or below, the half-frame indication information may be signaled implicitly by a PBCH DMRS. The PBCH DMRS indicates 3-bit information by using one of 8 PBCH DMRS sequences. Therefore, if L=4, the remaining one bit except for two bits indicating an SSB index in the 3-bit information which may be indicated by 8 PBCH DMRS sequences may be used for half-frame indication.

Finally, the UE may acquire an SSB index based on the DMRS sequence and the PBCH payload. SSB candidates are indexed from 0 to L-1 in a time order within an SSB burst set (i.e., half-frame). If L=8 or 64, three least significant bits (LSBs) b0 to b2 of the SSB index may be indicated by 8 different PBCH DMRS sequences. If L=64, three most significant bits (MSBs) b3 to b5 of the SSB index is indicated by the PBCH. If L=2, two LSBs b0 and b1 of an SSB index may be indicated by 4 different PBCH DMRS sequences. If L=4, the remaining one bit b2 except for two bits indicating an SSB index in 3-bit information which may be indicated by 8 PBCH DMRS sequences may be used for half-frame indication.

Figure 15:
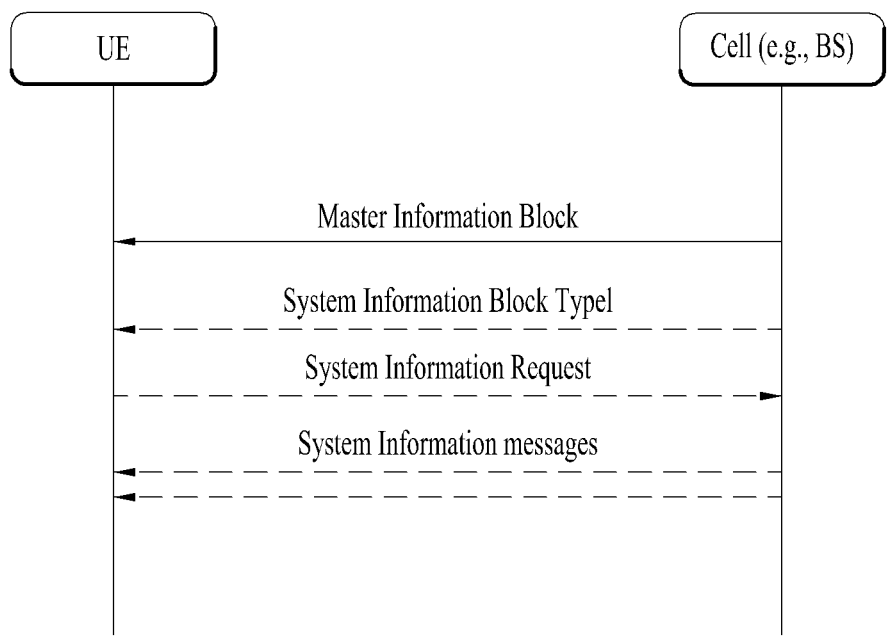

FIG. 15 illustrates a process of acquiring system information (SI). A UE may acquire access stratum (AS)/non-access stratum (NAS) information through the process of acquiring the SI. The process of acquiring the SI may be applied to a UE in an RRC_IDLE state, an RRC_INACTIVE state, and an RRC_CONNECTED state.

The SI is categorized into a master information block (MIB) and a plurality of system information blocks (SIBs). The MIB and the SIBs may again be categorized into minimum SI and other SI. Here, the minimum SI may consist of the MIB and SIB 1 and includes basic information required for initial access and information for acquiring other SI. Here, SIB 1 may be referred to as remaining minimum system information (RMSI). Details of the SI may refer to the following description.

The MIB includes information/parameters related to system information block type 1 (SIB1) reception and is transmitted on a PBCH of an SSB. During initial cell selection, the UE assumes that a half frame having the SSB is repeated at a periodicity of 20 ms. The UE may confirm whether there is a control resource set (CORESET) for a Type0-PDCCH common search space based on the MIB. The Type0-PDCCH common search space is a type of PDCCH search space and is used to transmit a PDCCH that schedules an SI message. When the Type0-PDCCH common search space is present, the UE may determine, based on information in the MIB (e.g., pdcch-ConfigSIB1131), (i) a plurality of consecutive RBs and one or more consecutive symbols constituting the CORESET, and (ii) a PDCCH occasion (i.e., a time domain position for PDCCH reception). When the Type0-PDCCH common search space is absent, pdcch-ConfigSIB1 provides information about a frequency position at which the SSB/SIB1 is present and information about a frequency range in which the SSB/SIB1 is absent.

SIB1 includes information about availability and scheduling (e.g., a transmission period or an SI-window size) of remaining SIBs (hereinafter, SIBx where x is an integer equal to or larger than 2). For example, SIB1 may indicate whether SIBx is periodically broadcast or is provided at the request of the UE in an on-demand manner. When SIBx is provided in an on-demand manner, SIB1 may include information needed for the UE to perform an SI request. SIB1 is transmitted on a PDSCH. A PDCCH that schedules SIB1 is transmitted through the Type0-PDCCH common search space. SIB1 is transmitted on a PDSCH indicated by the PDCCH.

SIBx is included in the SI message and is transmitted on the PDSCH. Each SI message is transmitted in a time window (i.e., an SI-window) that is periodically generated.

Figure 16:
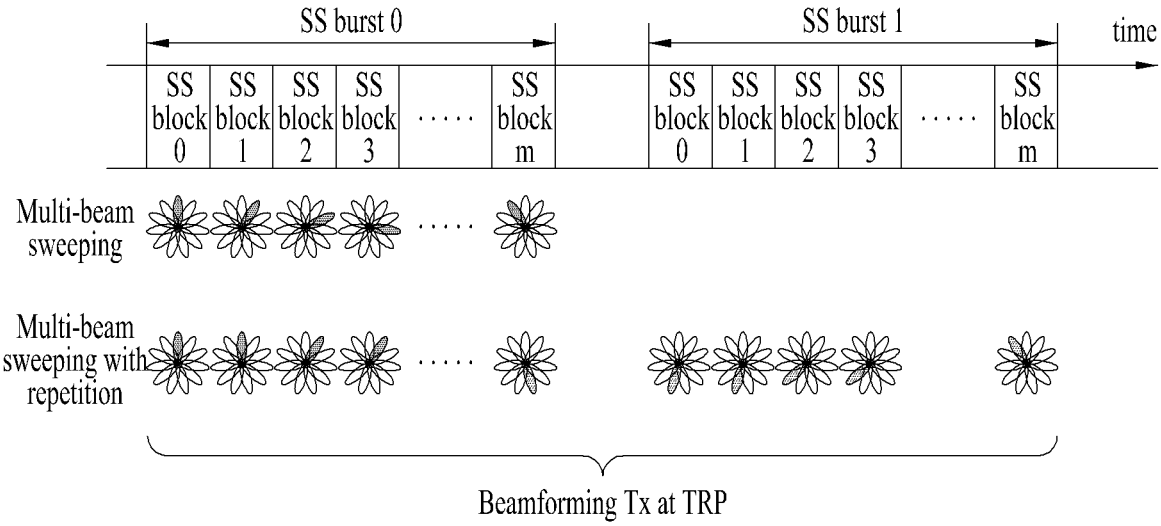

FIG. 16 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). Referring to FIG. 10, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Figure 17:
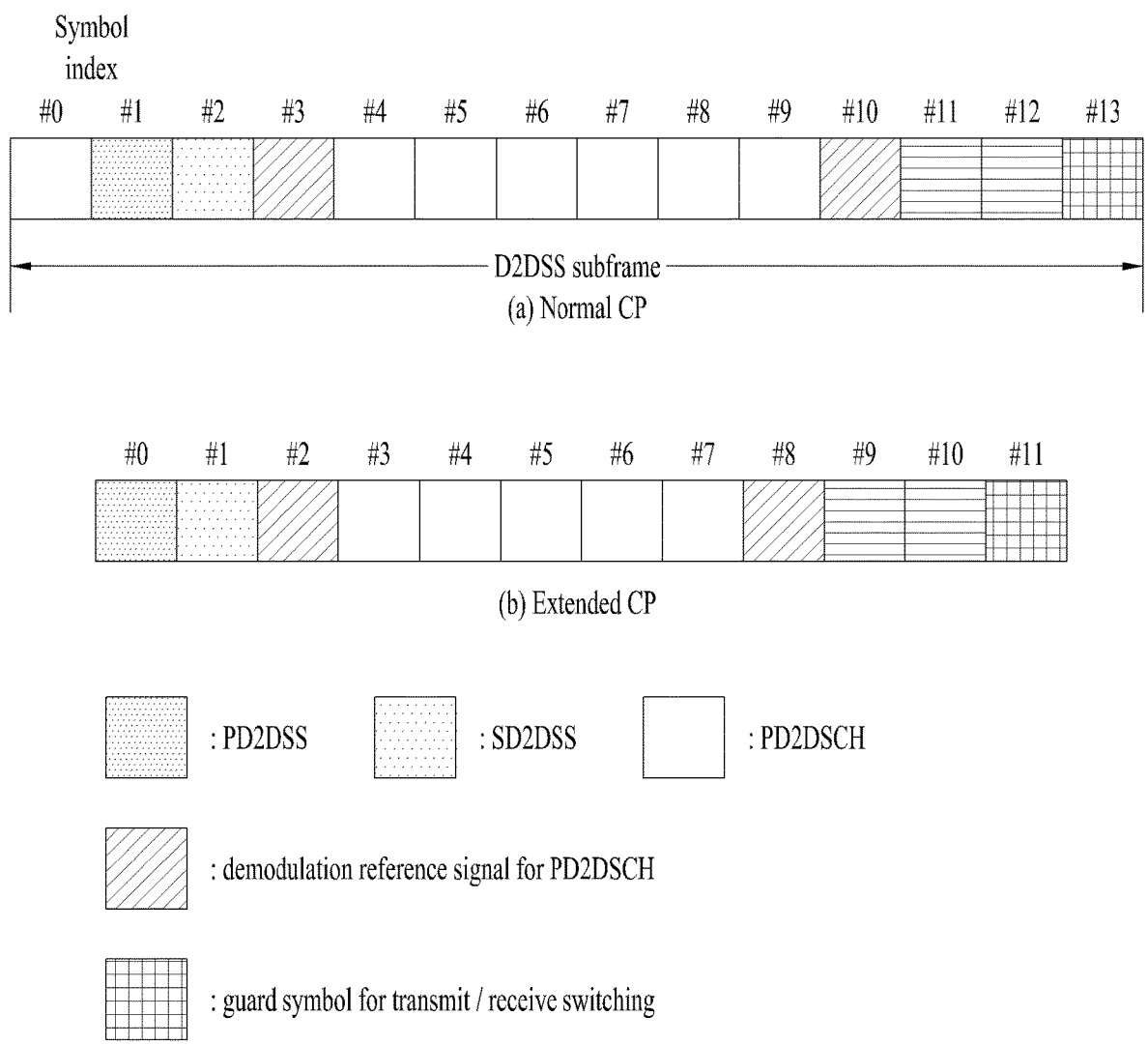
FIGS. 17 and 18 are diagrams illustrating a synchronization signal configuration in device-to-device (D2D) communication supporting an LTE system.

FIG. 17 is a diagram illustrating a transmission method of an SL synchronization signal for transmission mode 1 and transmission mode 2 in SL communication supporting an LTE system.

In an OFDM system, when time/frequency is out of synchronization, OFDM signals may be incapable of being multiplexed between different UEs due to inter-cell interference. In order to adjust synchronization, it is inefficient for SL UEs to directly transmit and receive synchronization signals so that all UEs individually adjust synchronization. Accordingly, in a distributed node system such as SL, a specific node may transmit a representative synchronization signal and the remaining UEs may be synchronized with the representative synchronization signal. In other words, for SL signal transmission and reception, a method may be used in which some nodes (in this case, a node may be a BS, a UE, or a synchronization reference node (SRN)) transmit a sidelink synchronization signal (SLSS) and the remaining UEs transmit and receive signals in synchronization with the SLSS.

The SLSS may include a primary sidelink synchronization signal (PSSS) and a secondary sidelink synchronization signal (SSSS). The PSSS may be configured to have a similar/modified/repeated structure of a Zadoff-Chu sequence of a predetermined length or a PSS. The PSSS may use a Zadoff-Chu root index (e.g., 26 or 37) different from that used by a DL PSS. The SSSS may be configured to have a similar/modified/repeated structure of an M-sequence or an SSS. If UEs are synchronized with a BS, the BS serves as an SRN. Unlike the DL PSS/SSS, the PSSS/SSSS follows a UL subcarrier mapping scheme. FIG. 17 illustrates a time resource unit in which SLSSs are transmitted. The time resource unit may represent a subframe in LTE/LTE-A or a slot in 5G, and details thereof are disclosed in the specification of 3GPP TS 36 series or 38 series. A physical sidelink broadcast channel (PSBCH) may be a (broadcast) channel carrying basic (system) information that a UE should first obtain before SL signal transmission and reception (e.g., SLSS-related information, a duplex mode (DM), a TDD UL/DL configuration, resource pool-related information, the type of an application related to the SLSS, a subframe offset (or a time resource unit offset), broadcast information, etc.). The PSBCH may be transmitted in the same time resource unit as the SLSS or in a time resource unit subsequent to the SLSS. A DMRS may be used to demodulate the PSBCH. In FIG. 17, a PD2DSS refers to the PSSS, an SD2DSS refers to the SSSS, and a PD2DSCH refers to the PSBCH.

The SRN may be a node that transmits the SLSS and/or the PSBCH. The SLSS may be a specific sequence, and the PSBCH may be a sequence representing specific information or may be a codeword produced by predetermined channel coding. The SRN may be a BS or a specific SL UE. In the case of partial network coverage or out-of-network coverage, the SRN may be a UE.

Figure 18:
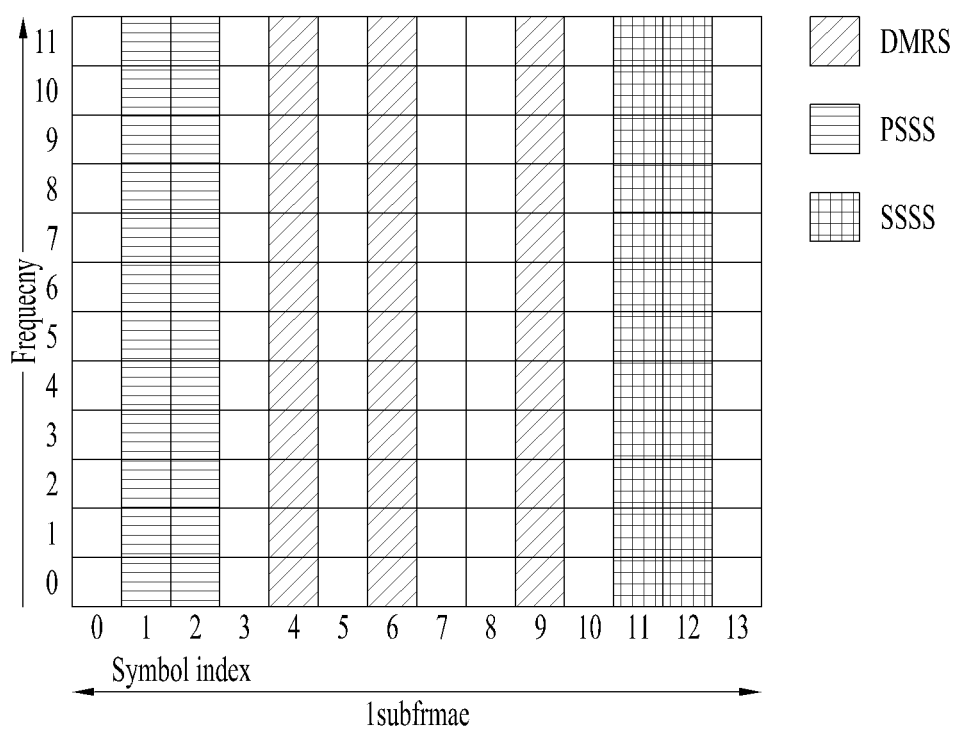

FIG. 18 illustrates a transmission method of an SLSS for transmission modes 3 and 4 in SL communication supporting an LTE system.

Unlike an SLSS configuration in transmission modes 1 and 2, an SLSS configuration in transmission modes 3 and 4 defines only one SLSS mapping type. This is because transmission modes 3 and 4 support only a normal CP and do not support an extended CP.

In addition, two symbols are allocated to a DMRS in transmission modes 1 and 2, whereas three symbols may be allocated to the DMRS in transmission modes 3 and 4 as illustrated in FIG. 18. Transmission modes 3 and 4 support a UE having higher mobility than transmission modes 1 and 2. Accordingly, more symbols are allocated to the DMRS in order to accurately estimate a varying channel environment of a UE having high mobility.

In a Uu interface of the NR system, an SS/PBCH block has been designed in consideration of extending transmission coverage using multiple antennas. However, since an NR V2X UE has a limitation on the number of antennas, it may be difficult to achieve large beamforming gain using multiple antennas. Therefore, if design of the NR SS/PBCH block is applied to an SSB of NR (hereinafter, 'S-SSB'), transmission coverage of the NR V2X UE may be restricted. Accordingly, the present disclosure proposes an S-SSB design method suitable for characteristics of the NR SL.

Figure 19:
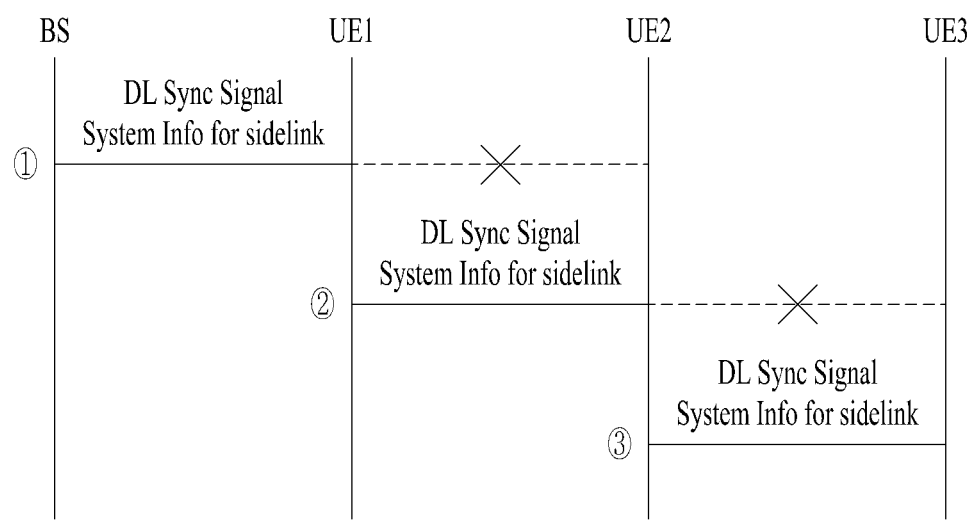
FIG. 19 is a diagram illustrating an implementation example of transmitting a synchronization signal according to an embodiment of the present disclosure.

FIG. 19 illustrates a process of configuring resources for V2X by a BS and a procedure of transmitting and receiving a V2X SS between UEs. Referring to FIG. 19, ① the BS transmits a DL SS to UE1. In this case, system information for SL k is transmitted. UE1 detects the DL SS transmitted by the BS and obtains system information therefor. In this case, UE2 and UE3 may not obtain such system information.

② UE1 may transmit an SLSS using the V2X resources allocated by the BS. In this case, a frequency resource for transmitting the SLSS may be a frequency resource predetermined for SL transmission, and a time resource for transmitting the SLSS may use a resource allocated by the BS. In addition, UE1 may transmit the system information for SL obtained from the BS to neighboring UEs. For example, since UE2 located in the vicinity of UE1 may not obtain the system information for SL from the BS, UE2 attempts to detect the SLSS transmitted by UE1 on the frequency resource predetermined for SL transmission. Upon detecting the SLSS transmitted by UE1, UE2 may obtain the system information for SL transmitted by UE1 based on the SLSS.

③ Next, UE2 may transmit the SLSS and the SL system information based on the SL system information obtained from UE1. UE3 in out-of-coverage performs detection of the SLSS transmitted by UE2 on a predetermined resource. Upon detecting the SLSS transmitted by UE2, UE3 may obtain the SL system information transmitted by UE2. In addition, UE3 in out-of-coverage may transmit an SL signal at a predetermined frequency location.

In other words, in a distributed node system such as SL, a specific node transmits a representative SS and the remaining UEs may be synchronized with the representative synchronization signal. That is, for SL transmission and reception, a method in which some nodes transmit an SS and the other UEs transmit and receive signals in synchronization with the synchronization signal may be used. In this case, the node may be a global navigation satellite system (GNSS), a BS, an eNB, a gNB, an NR UE, an LTE/NR V2X SL UE, an NR V2X SL UE, or the like.

Based on the operation of these SL UEs, embodiments according to the present disclosure may be implemented as follows.

On the other hand, in an NR Uu interface, the NR UE may receive a signal on the assumption that a transmission period of an NR SSB is 20 ms during initial cell selection and perform decoding up to 4 times within a PBCH transmission period of 80 ms. However, unlike the NR Uu interface, in NR V2X, a transmission period of an S-SSB may be significantly longer than 40 ms, so that the number of times by which the UE may decode the PSBCH within the S-SSB period may decrease. Accordingly, there is a need for a method of designing the S-SSB so that the UE receiving the S-SSB may increase the probability of acquiring a PSSS and an SSSS and succeeding in decoding the PSBCH. Meanwhile, the PSSS and the SSSS included in the S-SSB may be referred to as a sidelink primary synchronization signal (S-PSS) and a sidelink secondary synchronization signal (S-SSS), respectively. While, for convenience, a description will be given based on embodiments of the present disclosure applied to V2X communication, the embodiments are not limited thereto and may also be applied to D2D communication and to any fields only if SL communication is applied to the fields.

Figure 20:
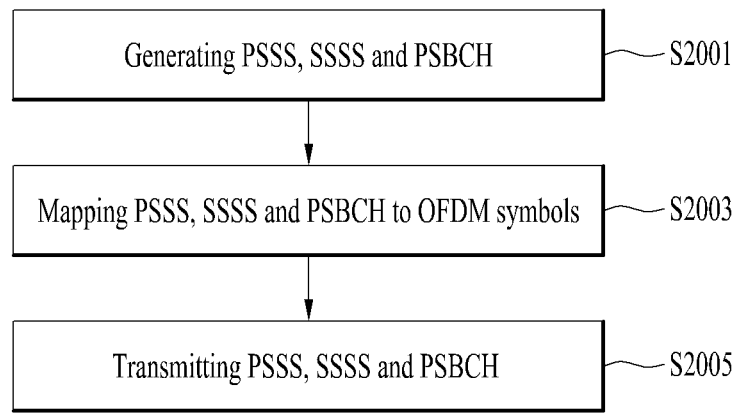
FIGS. 20 to 22 are diagrams illustrating implementation examples of operations of transmitting and receiving UEs according to the present disclosure.
Figure 21:
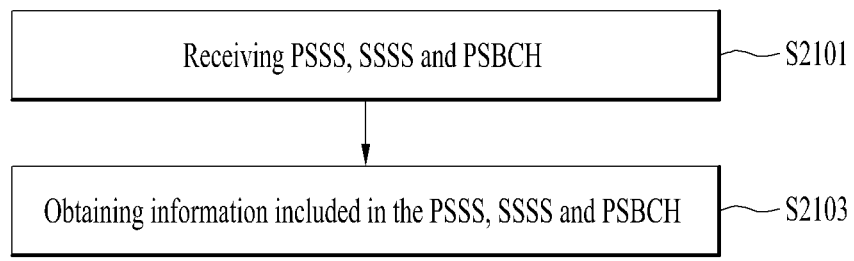
Figure 22:
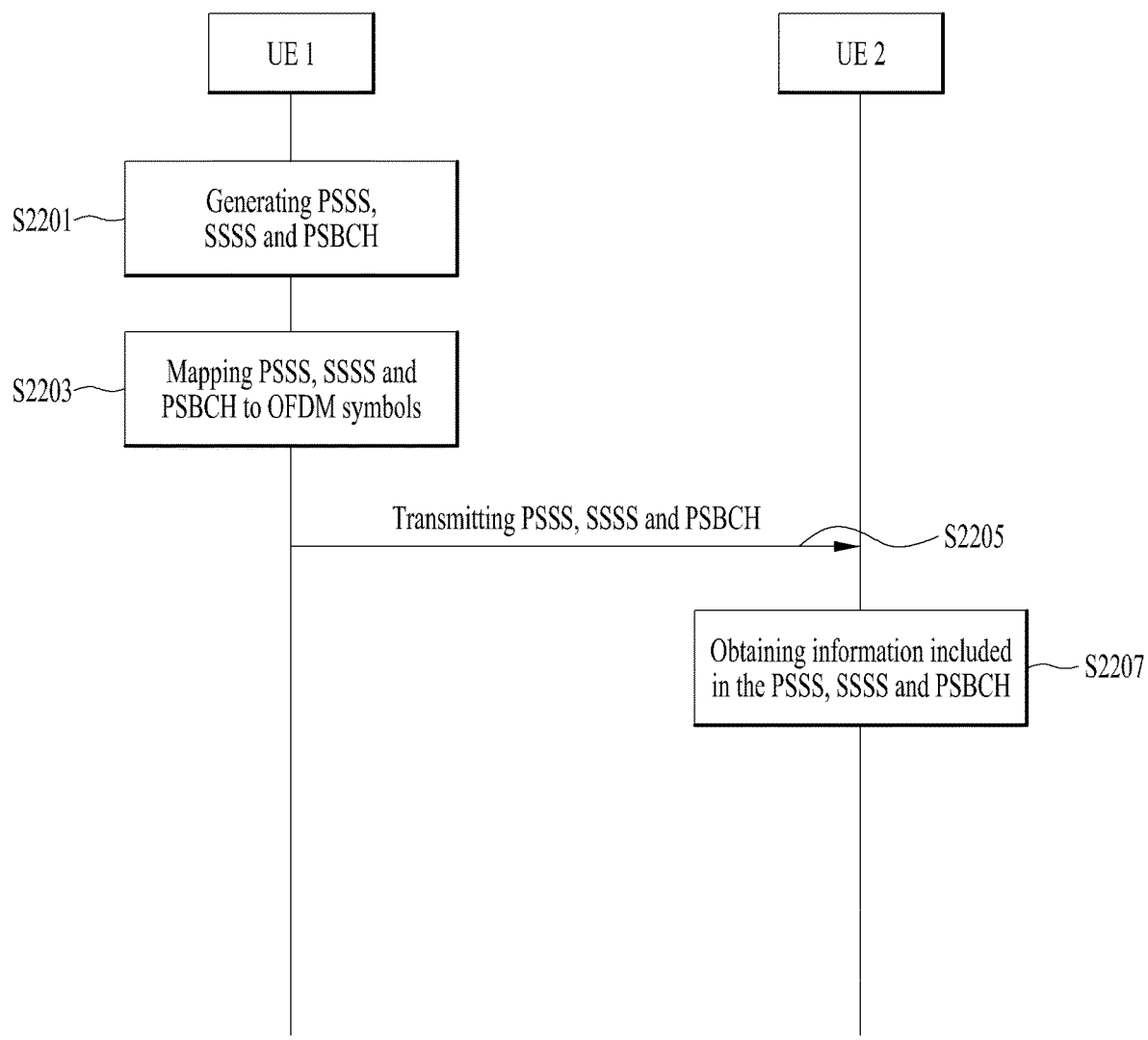

FIGS. 20 to 22 are diagrams illustrating implementation examples of a V2X UE according to an embodiment of the present disclosure.

FIG. 20 is a diagram illustrating an implementation example of a V2X transmitting UE according to an embodiment of the present disclosure. Referring to FIG. 20, the transmitting UE may generate a PSSS, an SSSS, and a PSBCH (S2001). In this case, the transmitting UE may generate sequences of the PSSS and the SSSS based on Embodiment 1 and generate a payload of the PSBCH and a sequence of a DMRS mapped to a symbol to which the PSBCH is mapped. As described with reference to FIG. 19, when the PSSS, the SSSS, and the PSBCH are generated, the synchronization signal received from a BS or another V2X UE may be considered.

The transmitting UE may map the generated PSSS, SSSS, and PSBCH to a plurality of OFDM symbols (S2003). In this case, a specific method of mapping the PSSS, the SSSS, and the PSBCH may be based on Embodiment 2.

Thereafter, the transmitting UE may transmit the PSSS, the SSSS, and the PSBCH to a receiving UE (S2005).

FIG. 21 is a diagram illustrating the operation of a V2X receiving UE. Referring to FIG. 21, the receiving UE may receive the PSSS, the SSSS, and the PSBCH transmitted by the transmitting UE (S2101). In this case, the positions of symbols in which the PSSS, the SSSS, and the PSBCH are received may be based on Embodiment 2.

The receiving UE may acquire information included in the PSSS, the SSSS, and the PSBCH based on the received PSSS, SSSS, and PSBCH (S2103). In this case, the obtained information may be timing information for synchronization and/or information for identifying a transmitting UE or a cell. Meanwhile, such information may be obtained through the payload of the PSBCH and/or may be obtained through a sequence of the PSSS and/or the SSSS. A method of generating the sequence of the PSSS and/or the SSSS is based on Embodiment 1. The above-described information may also be obtained through a sequence of a DMRS mapped to a symbol to which the PSBCH is mapped.

FIG. 22 is a diagram illustrating an overall operation process of FIGS. 20 and 21 described above. Referring to FIG. 22, the transmitting UE may generate a PSSS, an SSSS, and a PSBCH (S2201). In this case, the transmitting UE may generate sequences of PSSS and SSSS based on Embodiment 1 and generate a payload of the PSBCH and a sequence of a DMRS mapped to a symbol to which the PSBCH is mapped. As described with reference to FIG. 19, in generating the PSSS, the SSSS, and the PSBCH, the synchronization signal received from a BS or another V2X UE may be considered.

The transmitting UE may map the generated PSSS, SSSS, and PSBCH to a plurality of OFDM symbols (S2203). In this case, a specific method of mapping the PSSS, the SSSS, and the PSBCH may be based on Embodiment 2.

Thereafter, the transmitting UE may transmit the PSSS, the SSSS, and the PSBCH to the receiving UE (S2205). Upon receiving the above-described PSSS, SSSS, and PSBCH at a symbol location based on Embodiment 2, the receiving UE may acquire information included in the PSSS, SSSS and PSBCH based on the received PSSS, SSSS, and PSBCH (S2207). In this case, the obtained information may be timing information for synchronization and/or information for identifying the transmitting UE or a cell. Meanwhile, such information may be obtained through the payload of the PSBCH and/or may be obtained through the sequence of the PSSS and/or the SSSS. A method of generating the sequence of the PSSS and/or the SSSS may be based on Embodiment 1. The above-described information may be obtained through the sequence of the DMRS mapped to the symbol to which the PSBCH is mapped.

Embodiment 1: Design of PSSS, SSSS, and PSBCH

An SLSS may include a PSSS and an SSSS. An S-SSB or an S-SS/PSBCH block may include a PSSS, an SSSS, and a PSBCH.

(1) PSSS Sequence

The PSSS may be a similar/modified/repeated structure of an m-sequence of a predetermined length or an NR PSS. The PSSS may be generated using a cyclic shift, an initial value, or a polynomial, which is different from a cyclic shift, an initial value, or a polynomial that of the NR PSS, Specifically, an NR PSS sequence uses a length-127 m-sequence, and a polynomial of the NR PSS uses $x(i+7) = (x(i+4)+x(i))\mod 2$. In addition, $[x(6)\ x(5)\ x(4)\ x(3)\ x(2)\ x(1)\ x(0)]=[1\ 1\ 1\ 0\ 1\ 1\ 0]$ is used as an initial value of the NR PSS. The NR PSS may generate a total of three NR PSS sequences by applying three cyclic shift values to a base sequence. In this case, $\{0, 43, 86\}$ is used as the three cyclic shift values.

Sequence elements mapped to REs may be shifted by about N adjacent REs in the frequency domain, due to an influence of a frequency offset and Doppler frequency/Doppler spread that exist when the NR PSS is detected, and this may bring about the same effect as mapping of N cyclically shifted sample sequences to REs. Due to this effect, there may be a problem that it is difficult to distinguish between sequences having a cyclic shift value in the range of 0 to N in an initial access procedure. Accordingly, the NR PSS generates an NR PSS sequence by selecting cyclic shift values sufficiently spaced from each other such that it may be considered that there is no influence of a shift in the frequency domain. That is, since 127/3=42.33333, in order to generate three sequences using a cyclic shift for a length-127 m-sequence, cyclic shift values of {0, 43, 86} may be determined using 42 or 43 as an interval of the cyclic shift values. In other words, in generating three sequences, the cyclic shift values having the longest distance therebetween are selected.

In the NR system, when considering a frequency band, a maximum movement speed, and the inaccuracy of an oscillator of the UE, it may be assumed that a sequence is shifted by about +/−2 REs from a specific subcarrier spacing. Therefore, in order to distinguish between the NR PSS sequence and the NR PSSS sequence. when configuring the NR PSSS sequence, it may be remarkably effective to use cyclic shift values having as long a distance as possible from cyclic shift values used to generate the NR PSS sequence, except for the cyclic shift values used to generate the NR PSS sequence, to generate the NR PSSS sequence.

The NR PSS sequence uses a length-127 (=L) m-sequence, and cyclic shift values used to generate 3 (=M) sequences are designed to have an interval of ceiling (127/3)=43 which is as close as possible to L/3.

Therefore, if a polynomial and an initialization value for generating the NR PSSS sequence are the same as a polynomial and an initialization value of the NR PSS sequence, it is desirable to select cyclic shift values used to generate the NR PSSS sequence such that the interval between cyclic shift values for the NR PSSS is maximized in consideration of an interval of the cyclic shift values for the NR PSS sequence. For example, when the NR PSS uses an interval of ceiling (L/3), it is desirable to select a value corresponding to ½ of the interval between the cyclic shift values for the NR PSS as the cyclic shift values for the NR PSSS. For example, if the interval between the cyclic shift values for the NR PSS sequence is called an offset, the interval between the cyclic shift values for the NR PSSS sequence may be determined to be a value corresponding to ceiling (offset/2) or floor (offset/2).

For example, if the NR PSS sequence uses 0, 43, and 86 as the cyclic shift values, the NR PSSS sequence may use at least some of values 21 (or 22), 64 (or 65), or 107 (or 108) as the cyclic shift values. For example, if two NR PSSS sequences are to be generated, two of {21, 64, 107} may be selected as the cyclic shift values or two of {22, 65, 108} may be selected as the cyclic shift values. More specifically, if two NR PSSS sequences are to be generated, cyclic shift values of {21, 107} or {22, 108} may be selected. Likewise, cyclic shift values of {21, 64} or {22, 65} may be selected for the NR PSSS sequence.

When configuring the NR PSSS sequence, the same polynomial as a polynomial of the NR PSS and an initial value different from an initial value of the NR PSS may be used in order to distinguish the NR PSSS from the NR PSS. In this case, the cyclic shift values for the NR PSSS sequence may be appropriately selected according to the number of required sequences and may select values having as long an interval as possible between the NR PSS sequence and the NR PSSS sequence without overlapping with the cyclic shift values of the NR PSS sequence. Alternatively, when configuring the NR PSSS sequence, a polynomial different from a polynomial of the NR PSS may be used in order to distinguish the NR PSSS from the NR PSS.

A plurality of NR PSSS sequences generated according to the above-described methods may be selectively used according to purpose. For example, a plurality of NR PSSS sequences may be used for the purpose of indicating a coverage state of a UE. For example, among the NR PSSS sequences, some of the sequences may be used by an out-of-coverage UE, and at least some of the remaining sequences may be used by an in-coverage UE. Thereby, an SL UE may be aware of a coverage state of an SL UE that has transmitted an SS by receiving the NR PSSS and performing signal detection. Alternatively, an SL UE may discern the type of system information that an SL UE that has transmitted the SS desires to transmit by receiving the NR PSSS and performing signal detection.

(2) SSSS Sequence

The SSSS may have a similar/modified/repeated structure of a Gold sequence of a predetermined length or the NR SSS.

A cyclic shift, an initial value, or a polynomial different from a cyclic shift, an initial value, or a polynomial of the NR SSS may be used to generate the SSSS.

Specifically, the NR SSS sequence uses a length-127 Gold sequence. To generate the Gold sequence, a polynomial $x_0(i+7)=(x_0(i+4)+x_0(i))\bmod 2$, which is applied to the NR PSS, is used for one m-sequence of two m-sequences, and a polynomial $x_1(i+7)=(x_1(i+1)+x_1(i))\bmod 2$ is used for the other m-sequence of the two m-sequences. In addition, initial values $[x_0(6)\ x_0(5)\ x_0(4)\ x_0(3)\ x_0(2)\ x_0(1)\ x_0(0)]=[0\ 0\ 0\ 0\ 0\ 0\ 1]$ and $[x_1(6)\ x_1(5)\ x_1(4)\ x_1(3)\ x_1(2)\ x_1(1)\ x_1(0)]=[0\ 0\ 0\ 0\ 0\ 0\ 1]$ are used for the above two polynomials, respectively.

A total of 1008 sequences is generated for the NR SSS. In the first m-sequence, 9 sequences are generated using cyclic shifts (e.g., {0,5,10, . . . , 40}) with an offset of 5 and, in the second m-sequence, 112 sequences are generated using cyclic shifts (e.g., {0,1,2, . . . ,111}) with an offset of 1. In addition, 1008 (=9*112) sequences are generated by performing an element-wise multiplication operation based on modulo 2 on the two m-sequences. Since three NR PSS sequences are generated, the NR SSS sequences are grouped into three groups, and each group consists of 336 sequences. That is, the 0-th to 335-th sequences form the first group, the 336-th to 671-th sequences form the second group, and the 672-th to 1007-th sequences form the third group.

In order to distinguish between the NR SSSS sequence and the NR SSS sequence, the NR SSSS sequence may be generated using cyclic shift values different from cyclic shift values used for the NR SSS sequence. Since the NR SSS sequence characteristically generates two m-sequences by a modulo operation, a Gold sequence which is distinguishable from a Gold sequence of the NR SSS may be generated even when cyclic shift values different from cyclic shift values used for one of the two m-sequences are used.

For example, if a total of 9 cyclic shift values is used by applying an offset of 5 to the first m-sequence of the NR SSS sequence, the NR SSSS sequence may select a total of N cyclic shift values by applying an offset interval of M from among cyclic shift values unused for the NR SSS sequence. For example, if cyclic shift values are used in the range of 0 to 40 at an offset of 5 to generate the NR SSS sequence, the NR SSSS sequence may select cyclic shift values from values outside the range of cyclic shift values of the NR SSS sequence. For example, cyclic shift values for the NR SSSS may be selected in the range of 45 to 122. For example, similar to the NR SSS, if an offset of 5 is considered even in the NR SSSS, cyclic shift values of {45, 50, 55, 60, 65, 70} may be used. In this case, the other m-sequence for the NR SSSS may be generated based on cyclic shift values at an offset of 1.

When configuring the NR SSSS sequence, the same polynomial as a polynomial for the NR SSS sequence and an initial value different from an initial value for the NR SSS sequence may be used in order to distinguish the NR SSSS sequence from the NR SSS sequence. Alternatively, when configuring the NR SSSS sequence, a polynomial different from a polynomial for the NR SSS may be used to distinguish the NR SSSS sequence from the NR SSS sequence.

In two polynomials for the NR SSS, i.e., $x_0(i+7)=(x_0(i+4)+x_0(i))\bmod 2$ and $x_1(i+7)=(x_1(i+1)+x_1(i))\bmod 2$, $x_0(i+7)=(x_0(i+4)+x_0(i))\bmod 2$ is commonly used with the polynomial for the NR PSS. However, if the polynomials $x_0(i+7)=(x_0(i+4)+x_0(i))\bmod 2$ and $x_1(i+7)=(x_1(i+1)+x_1(i))\bmod 2$ are used for the NR SSSS, the polynomial $x_1(i+7)=(x_1(i+1)+x_1(i))\bmod 2$ may be used for the NR PSSS.

A plurality of NR SSSS sequences generated according to the above-described methods may be selectively used according to purpose. For example, the NR SSSS sequences may be used for the purpose of indicating a synchronization source of a UE. For example, a GNSS, a gNB, an eNB, or an LTE V2X UE may be the synchronization source, and the synchronization source may be identified through the NR SSSS. In addition, the NR SSSS sequences may be used for the purpose of indicating whether the synchronization source or the UE is in an in-coverage state or an out-of-coverage state. In the case of an in-coverage UE, the NR SSSS sequences may be used to specify the synchronization source. For example, through mapping to indexes of the NR SSSS sequences, a specific index range may be used to designate in-coverage, and another index range may be used to designate out-of-coverage. Thereby, an SL UE may be aware of the coverage state of an SL UE that has transmitted the synchronization signal by receiving the NR SSSS and performing signal detection. Alternatively, an SL UE may distinguish the type of system information that an SL UE that has transmitted the synchronization signal desires to transmit by receiving the NR SSSS and performing signal detection.

Embodiment 2: Resource Allocation of S-SSB

An S-SSB for NR V2X may consist of N continuous or discontinuous OFDM symbols and M continuous or discontinuous RBs. The OFDM symbols and RBs constituting the S-SSB may be used for PSSS/SSSS/PSBCH transmission/reception.

It may be assumed that a PSSS/SSSS/PSBCH included in the S-SSB is transmitted through the same antenna port. Therefore, it may be assumed that properties of long-term characteristics of a radio channel associated with the PSSS/SSSS/PSBCH (e.g., a Doppler spread, a Doppler frequency, and a delay spread) are similar. It may also be assumed that the S-SSB is transmitted through a single antenna port. If a transmitting end has a plurality of antenna elements, the transmitting end may determine a transmission precoding vector on the assumption that the same transmission precoding vector is used for OFDM symbols and RBs for one S-SSB.

The NR V2X S-SSB may be mapped in OFDM symbols other than the first OFDM symbol and the last OFDM symbol of a slot. The first OFDM symbol may be used to transmit an arbitrary signal for automatic gain control (AGC) of a receiving UE. The last OFDM symbol may be configured as a guard symbol in order to prevent interference that may occur asynchronously on time between an SL UE and a UL/DL UE so that a signal may not be transmitted in the last OFDM symbol.

An NR SS/PBCH block includes 4 OFDM symbols and 20 RBs. On the other hand, the NR V2X S-SSB may use more OFDM symbols than the OFDM symbols used for the NR SS/PBCH block in order to guarantee coverage enhancement and one-shot detection performance.

In a specific OFDM symbol of the NR SS/PBCH block, some RBs may be used for the SSS and the remaining RBs may be used for the PBCH. In the NR V2X S-SSB, a PBCH may not be transmitted in an OFDM symbol in which the SSSS is transmitted. This may bring about an effect of boosting energy to RBs in which the SSSS is transmitted. In addition, it may be assumed that the energy of an RE on which the PSSS is transmitted and/or an RE on which the SSSS is transmitted is higher than the energy of a PBCH DMRS RE and a PBCH data RE by a certain dB. For example, it may be assumed that the energy of the RE on which the PSSS is transmitted and/or the RE on which the SSSS is transmitted is higher by 3 dB or 6 dB than the energy of the PBCH DMRS RE and the PBCH data RE.

In addition, it may be assumed that the PSSS and the SSSS use the same bandwidth and use the same center frequency of the bandwidth. The PSBCH may be transmitted in a bandwidth equal to or wider than bandwidths of the PSSS and the SSSS. In this case, it may be assumed that the center frequency of the bandwidth for the PSBCH and the center frequencies for the bandwidths of the PSSS and SSSS are the same. In other words, the center frequencies of the bandwidths for the PSSS, the SSSS, and the PSBCH may all be the same.

(1) Allocation of PSSS Resource

It is desirable for the V2X UE to use more time resources, i.e., more OFDM symbols, for S-SSB transmission than time resources used for the NR SS/PBCH block in order to extend signal transmission coverage caused by the limitation of transmission power. In order to extend transmission coverage of the PSSS, a plurality of OFDM symbols may be used for NR PSSS transmission. Assuming that N OFDM symbols are used for the PSSS, it may be desirable that the N OFDM symbols be continuous. In this case, N may be, for example, 2, 3, 4, or greater. The above-described method may reduce detection complexity when the receiving UE performs symbol level detection.

The PSSS sequence may be mapped to N continuous OFDM symbols. In this case, the PSSS sequence may be mapped to one OFDM symbol and may be repeatedly mapped to the continuous OFDM symbols. Alternatively, the PSSS sequence may be mapped to m specific OFDM symbols.

When a length-127 m-sequence is used as in the NR PSS, 12 RBs may be used as PSSS frequency resources as in the NR PSS so that the length-127 sequence may be mapped to 144 REs. In addition, the PSSS sequence may be transmitted using more OFDM symbols than OFDM symbols for the NR PSS sequence while using fewer frequency resources for the PSSS sequence than frequency resources for the NR PSS sequence. This may be limited to the case in which the number of REs used for the PSSS in one OFDM symbol is less than the sequence length (=127) of the PSSS.

(2) Allocation of SSSS Resource

Similar to the case of the PSSS, it may be desirable to use more time resources, i.e., more OFDM symbols, for an SSSS sequence than time resources used for the NR SSS. Assuming that N OFDM symbols are used for the SSSS, it may be desirable that the N OFDM symbols be continuous. In this case, N may be, for example, 2, 3, 4, or greater.

N OFDM symbols may be distributively mapped in the time domain. That is, the N OFDM symbols may be discontinuously mapped. If OFDM symbols for the SSSS are discontinuous, time diversity gain may be expected and, when a carrier frequency offset (CFO) is estimated using the SSSS, accuracy of CFO estimation may be improved.

(3) Allocation of PSBCH Resource

The PSBCH may be transmitted on a time resource distinguishable from the SLSS including the PSSS and the SSSS. The PSBCH may be modulated and demodulated by CP-based OFDM. Each PSBCH may include DMRS REs and data REs. In other words, data (or payload) of the PSBCH and a DMRS for demodulating the PSBCH may be mapped in the same OFDM symbol. In other words, the DMRS for PSBCH demodulation may be mapped to at least some of a plurality of OFDM symbols to which the data (or payload) of the PSBCH is mapped.

In this case, the DMRS REs are arranged at equal intervals within an OFDM symbol, and the DMRS REs in each OFDM symbol to which the PSBCH is allocated use the same frequency position. This may facilitate CFO and/or Doppler estimation. A sequence of the DMRS may be initialized according to a specific ID (e.g., a cell ID and/or an ID for identifying a transmitting UE). A DMRS sequence value may be determined according to the initialization value.

For example, the DMRS sequence is generated using a Gold sequence, and at least a specific ID may be used for an initialization value of the Gold sequence. The specific ID may be the same as an ID detected from the SSSS sequence. If the S-SSB is repeatedly transmitted with a specific index, an index indicating the S-SSB may be used for the initialization value of the DMRS sequence.

At least 4 OFDM symbols may be used for the PSBCH. However, in order to guarantee coverage extension and decoding performance, more OFDM symbols, such as 6 or 8 OFDM symbols, may be used for the PSBCH.

Considering that V2X is wireless communication for a UE moving at a high speed, OFDM symbols or OFDM symbol indexes to which the PSBCH is allocated may be determined so as to obtain maximum time diversity gain on a time-varying channel. For example, the OFDM symbols to which the PSBCH is allocated may be discontinuously distributed and arranged. When OFDM symbols for the PSBCH are distributivity arranged, accuracy of CFO/Doppler estimation may be improved. When the S-SSB is configured, PSBCH OFDM symbols may be arranged in consideration of transmission (Tx)/reception (Rx) switching, or a basic arrangement thereof may be modified for transmission and reception.

In addition, among the PSBCH OFDM symbols used for the S-SSB, the last OFDM symbol may be mapped in a comb type for Tx/Rx switching. In this case, the UE may puncture a portion of a rear part of a specific OFDM symbol duration in the time domain and then transmit a signal. For example, the receiving UE may perform fast Fourier transform (FFT) on the assumption that a signal of specific OFDM symbols included in a rear part of the PSBCH received through the S-SSB has been punctured.

Alternatively, one OFDM symbol for the PSBCH may further be allocated in a switching period. For example, although a signal has not been transmitted in an OFDM symbol duration defined as a gap, the PSBCH may be transmitted in a partial time duration of a front part in the OFDM symbol duration defined as the gap. Alternatively, although an arbitrary signal is transmitted in OFDM symbols defined as an AGC duration, the PSBCH may be used as the arbitrary signal or the PSBCH may be transmitted in a partial time duration of a rear part of the OFDM symbols for AGC.

As described above, when the data and/or the DMRS are allocated in the comb type, a signal that is repeated in the time domain is generated. In this case, even if a part of the time-domain signal is punctured, the signal may be demodulated using a part of the repeated signal.

The PSSS or the PSBCH may be transmitted in OFDM symbols defined as an AGC duration, and a part of the PSBCH may be transmitted in a time period defined as a gap duration. Even in this case, although a part of a signal is distorted or a part of data is punctured, the signal may be detected or the data may be demodulated. AGC and switching gap may also be maintained.

The above-described methods may reduce detection complexity of the Rx UE when a Tx period or an Rx period becomes considerably long. For example, the Tx period of the S-SSB, 160 ms, may be longer than 20 ms, which is the Tx period of the SS/PBCH block in a Uu interface. Even in this case, according to the above-described methods, the Rx UE may reduce complexity of S-SSB detection.

A slot for transmitting the NR V2X S-SSB may be defined, and signals or channels for other purposes except for the S-SSB may not be subjected to frequency division multiplexing (FDM) or time division multiplexing (TDM) in the corresponding slot.

Alternatively, while the signals or channels having other purposes except for the S-SSB may not be subjected to FDM with the S-SSB in the slot in which the S-SSB is transmitted, the signals or channels may be subjected to TDM in the corresponding slot. The S-SSB may be repeatedly transmitted in a plurality of slots. In this case, it may be assumed that the repeatedly transmitted S-SSB is transmitted through the same beam. For example, it may be assumed that S-SSBs having the same index are transmitted through the same beam. In other words, it may be assumed that S-SSBs having the same index are in a quasi-colocation (QCL) relationship with each other.

If the repeatedly transmitted S-SSB is transmitted through different Tx beams, an identifier for a Tx beam through which the S-SSB is transmitted may be transmitted together with the S-SSB, and the Rx UE may identify, through the identifier, the Tx beam through which the S-SSB is transmitted.

In addition, the symbol location of the S-SSB may be configured in various forms.

FIGS. 23 to 26 illustrate various methods of allocating a PSSS/SSSS/PSBCH included in an S-SSB.

FIG. 23 illustrates discontinuous allocation of a PSSS/SSSS/PSBCH to a front part and a rear part of a slot. That is, the S-SSB is not allocated to OFDM symbols #5 to #8 corresponding to a middle part of a slot, and the PSSS/SSSS/PSBCH may be dividedly allocated to a front part and a rear part of the slot. In FIG. 23, the number of OFDM symbols of the PSBCH may be four. In Pattern 1, symbols of the PSBCH are mapped to be as far apart as possible on the time axis, so that Pattern 1 may be advantageous in terms of time diversity and CFO estimation accuracy.

In addition, Pattern 2 of FIG. 23 illustrates allocation similar to V2X PSSS/SSSS/PSBCH allocation in the LTE system.

In Pattern 3 of FIG. 23, the PSSS and SSSS are allocated to the front part of the slot, and the PSBCH is allocated to the rear part of the slot. In Pattern 2, the PSBCH is received before the PSSS and the SSSS are all received, so that the PSBCH is first buffered. In addition, after decoding of the PSSS and the SSSS is all ended, the buffered PSBCH should be decoded based on the decoded PSSS and SSSS, so that it may take a rather long time to decode the PSBCH and obtain information of the PSBCH. However, in Pattern 3, since the PSSS and the SSSS are all received and decoded, and then the PSBCH is received, the PSBCH may be decoded immediately while the PSBCH is received, and thus it may take a short time to detect the entire S-SSB. Therefore, Pattern 3 may be more suitable for V2X requiring a high-speed moving environment.

FIG. 24 illustrates various embodiments in which four OFDM symbols are used for the PSBCH as illustrated in FIG. 23 but the PSSS/SSSS/PSBCH are mapped to continuous OFDM symbols. Referring to FIG. 24, in order to reduce the time required to detect the entire S-SSB so as to be suitable for V2X that requires a high-speed moving environment as described above, the PSSS/SSSS may be continuously mapped to front symbols and the PSBCH may be continuously mapped to rear symbols as in Pattern 6 or Pattern 6-1.

However, in this case, a time diversity effect of the PSBCH may be reduced. Therefore, like Pattern 1/Pattern 1-1, the time diversity effect may be raised and the entire decoding time of the S-SSB may be reduced by mapping the PSBCH to one OFDM symbol in front of the PSSSS, mapping the PSBCH to one OFDM symbol between the PSSS and the SSSS, and mapping the PSBCH to the remaining required OFDM symbols after the SSSS.

FIGS. 25 to 26 illustrate allocation of a PSBCH to 6 OFDM symbols and to 8 OFDM symbols, respectively.

Referring to FIGS. 25 to 26, in order to reduce the overall decoding time of the S-SSB, the PSSS/SSSS may be mapped to front OFDM symbols and the PSBCH may be mapped to OFDM symbols after the SSSS as in Pattern 5 of FIG. 25, Pattern 4 of FIG. 26(*a*), and Pattern 5 of FIG. 26(*b*). However, in order to increase the time diversity effect of the PSBCH, the PSBCH may be allocated to some front OFDM symbols, the PSSS/SSSS may be continuously allocated to OFDM symbols after the PSBCH, and the PSBCH may be allocated to OFDM symbols after the SSSS is allocated, as in Pattern 2 of FIG. 25 and Pattern 2 of FIG. 26(*b*).

For the same purpose of increasing the time diversity effect of the PSBCH, the PSBCH may be allocated to some front OFDM symbols, the PSSS may be allocated to OFDM symbols located after the PSBCH, and the PSBCH may be allocated to OFDM symbols (e.g., one or two OFDM symbols) after the PSSS, as in Pattern 1 of FIG. 25 and Pattern 1 of FIG. 26(*b*). Next, the SSSS may be allocated to OFDM symbols after the PSBCH and the PSBCH may be allocated to OFDM symbols after the SSSS.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 27:
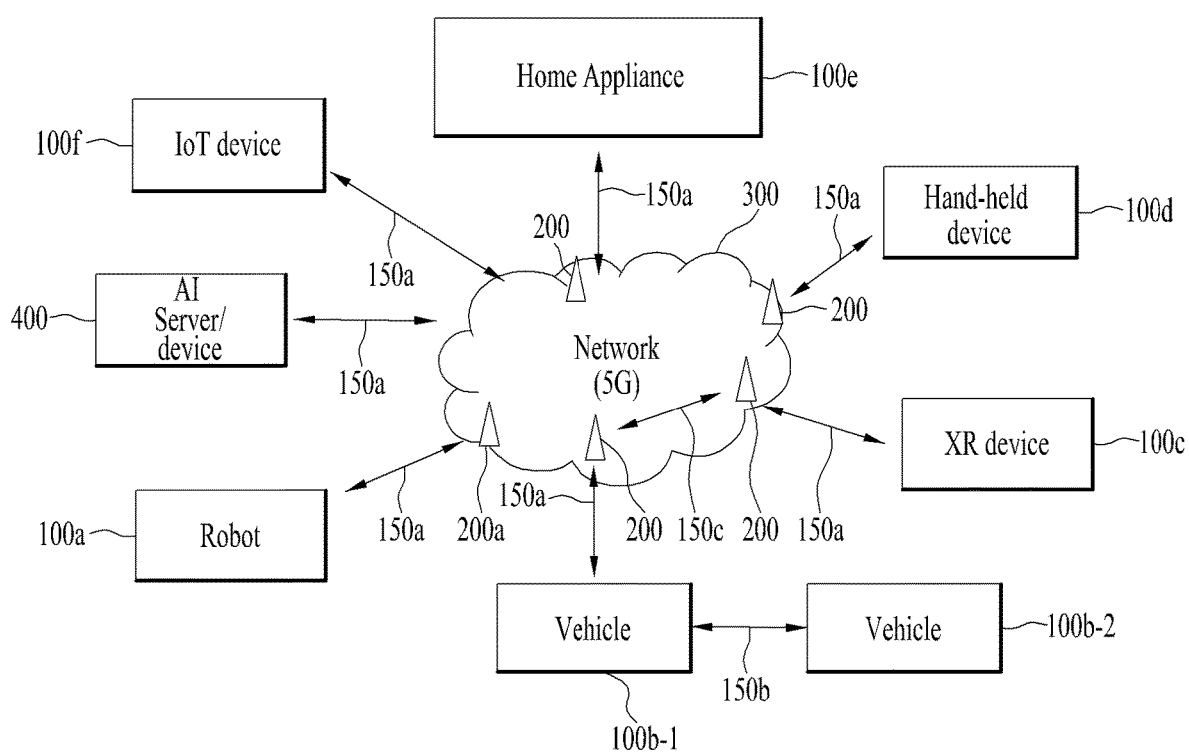
FIG. 27 illustrates an example of a communication system to which embodiments of the present disclosure are applied.

FIG. 27 illustrates a communication system 1 applied to the present disclosure.

Referring to FIG. 27, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HIVID), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., SL communication) with each other without intervention of the BSs/network. For example, the vehicles 100*b*-1 and 100*b*-2 may perform direct communication (e.g. V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, SL communication 150*b* (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 28:
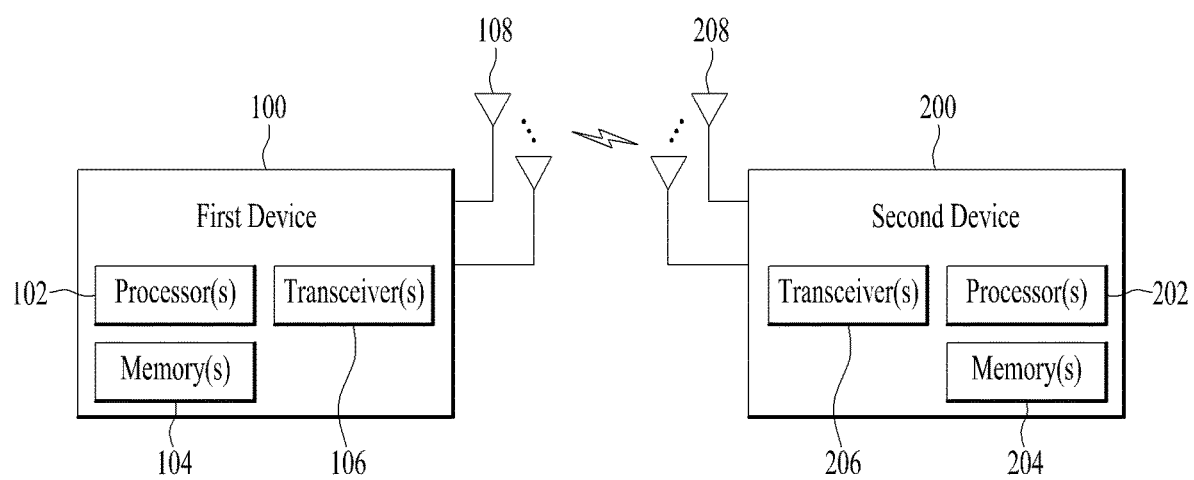
FIGS. 28 to 31 illustrate examples of various wireless devices to which embodiments of the present disclosure are applied.

FIG. 28 illustrates wireless devices applicable to the present disclosure.

Referring to FIG. 28, a first wireless device 100 and a second wireless device 200 may transmit wireless signals through a variety of RATs (e.g., LTE and NR). {The first wireless device 100 and the second wireless device 200} may correspond to {the wireless device 100*x* and the BS 200} and/or {the wireless device 100*x* and the wireless device 100*x*} of FIG. 27.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 according to an embodiment of the present disclosure and stored in the memory 104, will be described.

While the following operations will be described based on a control operation of the processor 102 in terms of the processor 102, software code for performing such operations may be stored in the memory 104.

The processor 102 may generate a PSSS, an SSSS, and a PSBCH. In this case, a Tx UE may generate sequences of the PSSS and the SSSS based on Embodiment 1 and generate a payload of the PSBCH and a sequence of a DMRS mapped to a symbol to which the PSBCH is mapped. As described with reference to FIG. 19, when the PSSS, the SSSS, and the PSBCH are generated, a synchronization signal received from a BS or another V2X UE may be considered.

The processor 102 may map the generated PSSS, SSSS, and PSBCH to a plurality of OFDM symbols. In this case, a specific method of mapping the PSSS, the SSSS, and the PSBCH may be based on Embodiment 2. Next, the processor 102 may control the transceiver 106 to transmit the PSSS, the SSSS, and the PSBCH to the second wireless device 200.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 200 according to an embodiment of the present disclosure and stored in the memory 204, will be described.

While the following operations will be described based on a control operation of the processor 202 in terms of the processor 202, software code for performing such operations may be stored in the memory 204.

The processor 202 may control the transceiver 206 to receive a PSSS, an SSSS, and a PSBCH transmitted by the first wireless device 100. In this case, the locations of symbols in which the PSSS, the SSSS, and the PSBCH are received may be based on Embodiment 2.

The processor 202 may obtain information included in the PSSS, the SSSS, and the PSBCH based on the received PSSS, SSSS, and PSBCH. The obtained information may be timing information for synchronization and/or information for identifying a Tx UE or a cell. Meanwhile, such information may be obtained through a payload of the PSBCH and/or may be obtained through a sequence of the PSSS and/or the SSSS. A method of generating the sequence of the PSSS and/or the SSSS may be based on Embodiment 1. The above-described information may also be obtained through the sequence of a DMRS mapped to a symbol to which the PSBCH is mapped.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 29:
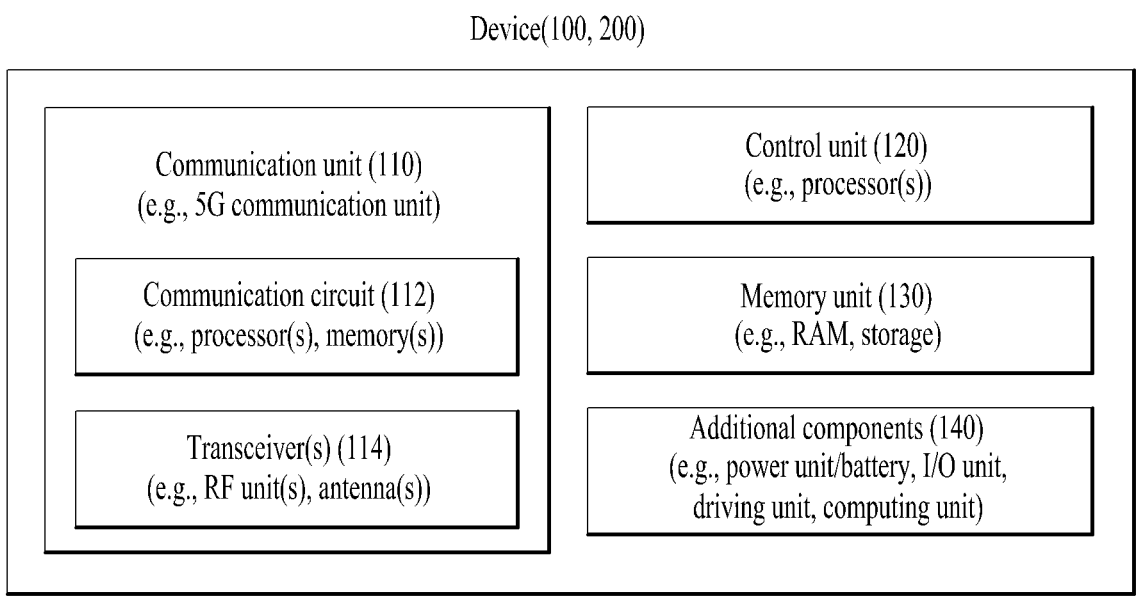

FIG. 29 illustrates another example of a wireless device applied to the present disclosure. The wireless device may be implemented in various forms according to a use case/service (refer to FIG. 27).

Referring to FIG. 29, wireless devices 100 and 200 may correspond to the wireless devices 100 and 200 of FIG. 28 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 28. For example, the transceiver(s) 114 may include the one or more transceivers 106 and 206 and/or the one or more antennas 108 and 208 of FIG. 28. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 27), the vehicles (100b-1 and 100b-2 of FIG. 27), the XR device (100c of FIG. 27), the hand-held device (100d of FIG. 27), the home appliance (100e of FIG. 27), the IoT device (100f of FIG. 27), a digital broadcasting terminal, a hologram device, a public safety device, an MTC device, a medical device, a FinTech device (or a finance device), a security device, a climate/environment device, the AI server/ device (400 of FIG. 27), the BSs (200 of FIG. 27), a network node, or the like. The wireless device may be mobile or fixed according to a use case/service.

In FIG. 29, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 29 will hereinafter be described with reference to the attached drawings.

Figure 30:
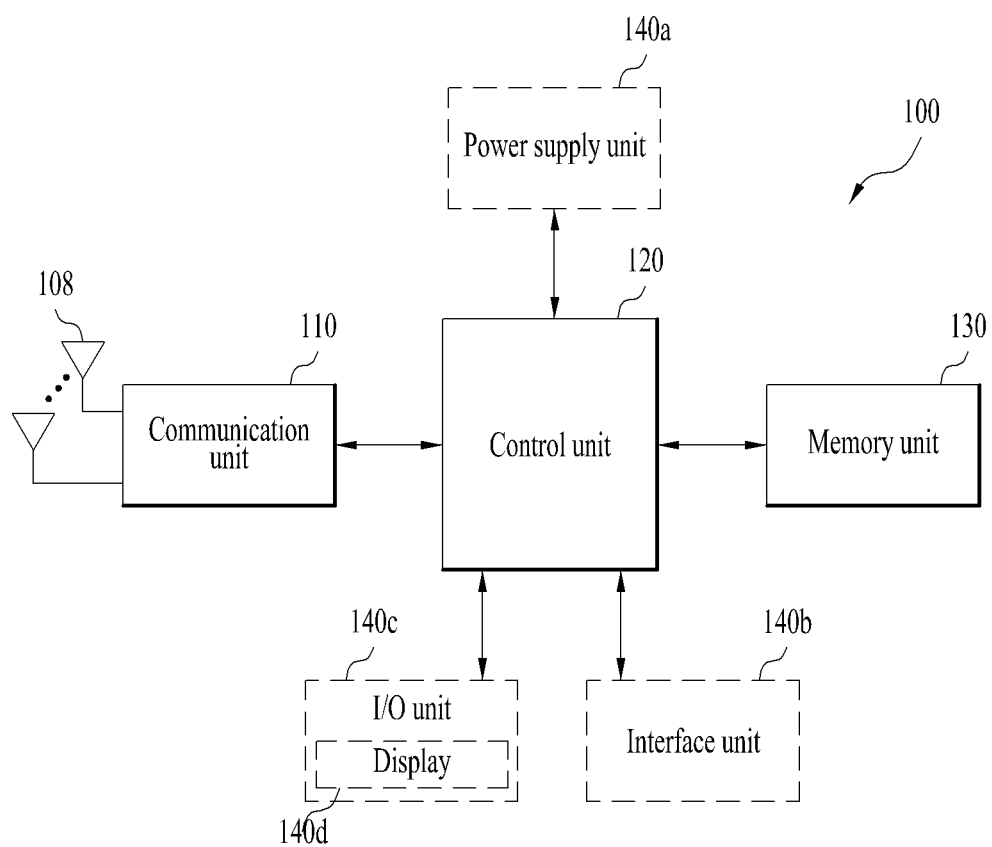

FIG. 30 is a block diagram illustrating a hand-held device 100 to which another embodiment of the present disclosure can be applied. The hand-held device may include a smartphone, a tablet (also called a smartpad), a wearable device (e.g., a smartwatch or smart glasses), and a portable computer (e.g., a laptop). The hand-held device 100 may be referred to as a mobile station (MS), a user terminal (UT), a mobile subscriber station (MSS), a subscriber station (SS), an advanced mobile station (AMS), or a wireless terminal (WT).

Referring to FIG. 30, the hand-held device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. The blocks 110 to 130/140a to 140c correspond to the blocks 110 to 130/140 of FIG. 29, respectively.

The communication unit 110 may transmit and receive signals (e.g., data and control signals) to and from another wireless device and a BS. The control unit 120 may perform various operations by controlling elements of the hand-held device 100. The control unit 120 may include an application processor (AP). The memory unit 130 may store data/parameters/programs/code/commands required for operation of the hand-held device 100. Further, the memory unit 130 may store input/output data/information. The power supply unit 140a may supply power to the hand-held device 100, and include a wired/wireless charging circuit and a battery. The interface unit 140b may support connection between the hand-held device and other external devices. The interface unit 140b may include various ports (e.g., an audio I/O port and a video I/O port) for connection to external devices. The I/O unit 140c may receive or output video information/signal, audio information/signal, data, and/or user-input information. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signals in the memory unit 130. The communication unit 110 may convert the information/signals into radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 31:
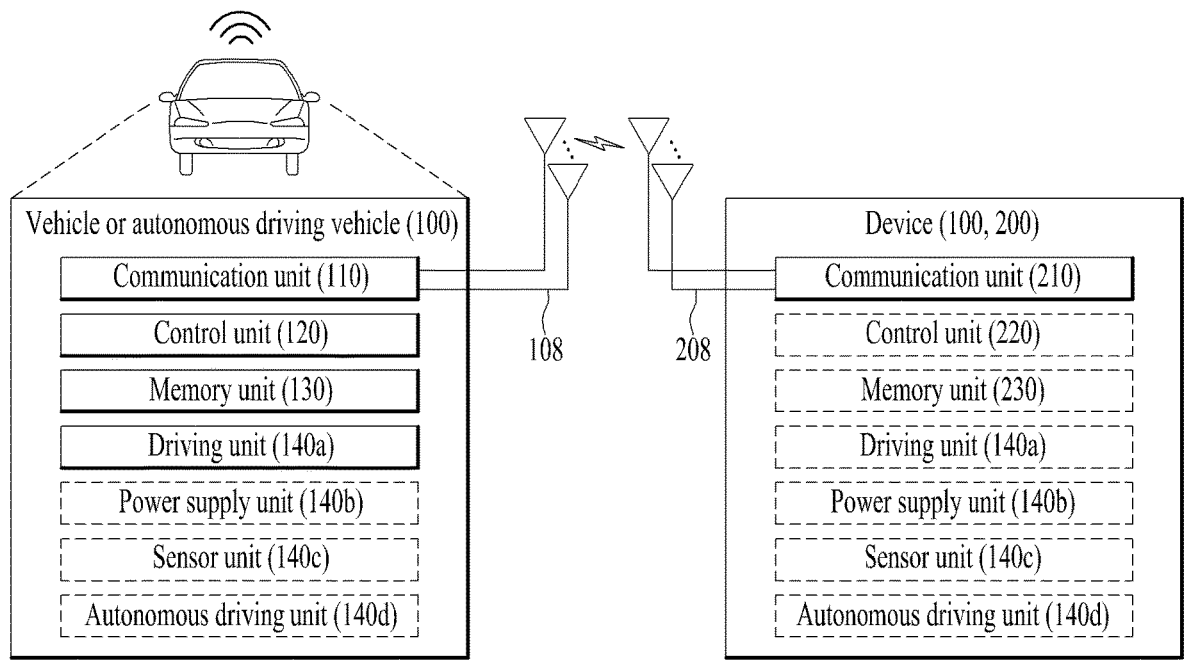

FIG. 31 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 31, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 29, respectively.

The communication unit 110 may transmit and receive signals (e.g., data and control signals) to and from external devices such as other vehicles, B Ss (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Figure 32:
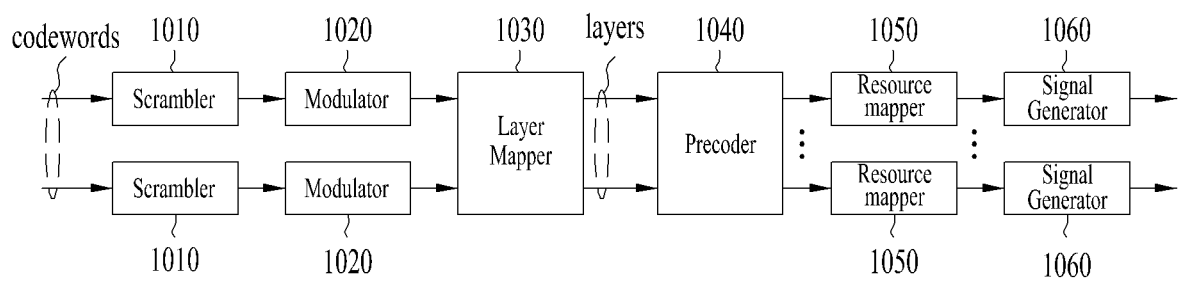
FIG. 32 illustrates an exemplary signal processing circuit to which embodiments of the present disclosure are applied.

FIG. 32 illustrates a signal processing circuit for Tx signals.

Referring to FIG. 32, a signal processing circuit 1000 may include a scrambler 1010, a modulator 1020, a layer mapper 1030, a precoder 1040, a resource mapper 1050, and a signal generator 1060. The operations/functions shown in FIG. 32 may be performed by the processors 102 and 202 and/or the transceivers 106 and 206 shown in FIG. 29, without being limited thereto. Hardware elements shown in FIG. 23 may be implemented by the processors 102 and 202 and/or the transceivers 106 and 206 shown in FIG. 23. For example, the blocks 1010 to 1060 may be implemented by the processors 102 and 202. In addition, the blocks 1010 to 1050 may be implemented by the processors 102 and 202 shown in FIG. 29, and the block 1060 may be implemented by the transceivers 106 and 206 shown in FIG. 29.

The codeword may be converted into a radio signal (or a radio frequency (RF) signal) through the signal processing circuit 1000 shown in FIG. 32. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK(pi/2-Binary Phase Shift Keying), m-PSK(m-Phase Shift Keying), m-QAM(m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (NxM) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an inverse fast Fourier transform (IFFT) module, a cyclic prefix (CP) inserter, a digital-to-analog converter (DAC), a frequency uplink converter, etc.

The signal processing steps for reception (Rx) signals in the wireless device may be arranged in the reverse order of the signal processing steps 1010 to 1060 shown in FIG. 25. For example, the wireless devices 100 and 200 (shown in FIG. 20) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

While the above-described method of transmitting and receiving a synchronization signal in wireless communication between UEs and the apparatus therefor have been described focusing on an example applied to the 5G NR system, the method and the apparatus are applicable to various wireless communication systems in addition to the 5G NR system.

What is claimed is:

1. A method of transmitting a sidelink signal by a user equipment (UE) in a wireless communication system, the method comprising:
mapping, in a sidelink synchronization signal block (S-SSB), a primary sidelink synchronization signal (PSSS), a secondary sidelink synchronization signal (SSSS), and a physical sidelink broadcast channel (PSBCH); and
transmitting the S-SSB in a slot including a plurality of orthogonal frequency division multiplexing (OFDM) symbols,
wherein OFDM symbols with indices 1 and 2 in the slot are OFDM symbols for the PSSS,
wherein OFDM symbols with indices 3 and 4 in the slot are OFDM symbols for the SSSS, and
wherein OFDM symbols with indices ranging from an index 5 to a second-to-last OFDM symbol immediately preceding a last OFDM symbol in the slot are OFDM symbols for the PSBCH.

2. The method of claim 1, wherein an OFDM symbol with an index 0 is a start OFDM symbol in the slot.

3. The method of claim 1, wherein the OFDM symbols for the PSSS and the OFDM symbols for the SSSS are four consecutive OFDM symbols.

4. The method of claim 1,
wherein the PSSS of the S-SSB is mapped only in the two OFDM symbols with indices 1 and 2, and
wherein the SSSS of the S-SSB is mapped only in the two OFDM symbols with indices 3 and 4.

5. The method of claim 1,
wherein a demodulation reference signal (DMRS) for the PSBCH is mapped to the OFDM symbols for the PSBCH.

6. The method of claim 1, wherein a normal cyclic prefix (CP) is configured in the slot, and
wherein the last OFDM symbol has an index 13, and the second-to-last OFDM symbol has an index 12.

7. The method of claim 1,
wherein the PSSS, the SSSS, and the PSBCH are not mapped to the last OFDM symbol of the slot.

8. An apparatus configured to transmit a sidelink signal in a wireless communication system, the apparatus comprising:
at least one processor; and
at least one computer memory operably connectable to the at least one processor and storing instructions that, when executed by the at least one processor, perform operations comprising:
mapping, in a sidelink synchronization signal block (S-SSB), a primary sidelink synchronization signal (PSSS), a secondary sidelink synchronization signal (SSSS), and a physical sidelink broadcast channel (PSBCH); and
transmitting the S-SSB in a slot including a plurality of orthogonal frequency division multiplexing (OFDM) symbols,
wherein OFDM symbols with indices 1 and 2 in the slot are OFDM symbols for the PSSS,
wherein OFDM symbols with indices 3 and 4 in the slot are OFDM symbols for the SSSS, and
wherein OFDM symbols with indices ranging from an index 5 to a second-to-last OFDM symbol immediately preceding a last OFDM symbol in the slot are OFDM symbols for the PSBCH.

9. The apparatus of claim 8, wherein an OFDM symbol with an index 0 is a start OFDM symbol in the slot.

10. The apparatus of claim 8, wherein the OFDM symbols for the PSSS and the OFDM symbols for the SSSS are four consecutive OFDM symbols.

11. The apparatus of claim 8,
wherein the PSSS of the S-SSB is mapped only in the two OFDM symbols with indices 1 and 2, and
wherein the SSSS of the S-SSB is mapped only in the two OFDM symbols with indices 3 and 4.

12. The apparatus of claim 8, wherein a normal cyclic prefix (CP) is configured in the slot, and
wherein the last OFDM symbol has an index 13, and the second-to-last OFDM symbol has an index 12.

13. The apparatus of claim 8,
wherein the PSSS, the SSSS, and the PSBCH are not mapped to the last OFDM symbol of the slot.

14. The apparatus of claim 8,
wherein a demodulation reference signal (DMRS) for the PSBCH is mapped to the OFDM symbols for the PSBCH.

15. A user equipment (UE) configured to operate in a wireless communication system, the UE comprising:
at least one transceiver;
at least one processor; and
at least one computer memory operably connectable to the at least one processor and storing instructions that, when executed by the at least one processor, perform operations comprising:
mapping, in a sidelink synchronization signal block (S-SSB), a primary sidelink synchronization signal (PSSS), a secondary sidelink synchronization signal (SSSS), and a physical sidelink broadcast channel (PSBCH); and
transmitting the S-SSB in a slot including a plurality of orthogonal frequency division multiplexing (OFDM) symbols,
wherein OFDM symbols with indices 1 and 2 in the slot are OFDM symbols for the PSSS,
wherein OFDM symbols with indices 3 and 4 in the slot are OFDM symbols for the SSSS, and
wherein OFDM symbols with indices ranging from an index 5 to a second-to-last OFDM symbol immediately preceding a last OFDM symbol in the slot are OFDM symbols for the PSBCH.

* * * * *